(12) United States Patent
Shibutani et al.

(10) Patent No.: US 8,734,997 B2
(45) Date of Patent: May 27, 2014

(54) NEGATIVE ELECTRODE FOR NONAQUEOUS ELECTROLYTE SECONDARY BATTERY

(75) Inventors: Satoshi Shibutani, Osaka (JP);
Hideharu Takezawa, Nara (JP);
Kazuyoshi Honda, Osaka (JP);
Toshitada Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 1200 days.

(21) Appl. No.: 12/444,634

(22) PCT Filed: Oct. 9, 2007

(86) PCT No.: PCT/JP2007/069691
§ 371 (c)(1),
(2), (4) Date: Apr. 7, 2009

(87) PCT Pub. No.: WO2008/044683
PCT Pub. Date: Apr. 17, 2008

(65) Prior Publication Data
US 2010/0112451 A1 May 6, 2010

(30) Foreign Application Priority Data

Oct. 10, 2006  (JP) ................. 2006-276214
Oct. 26, 2006  (JP) ................. 2006-290938

(51) Int. Cl.
*H01M 4/58* (2010.01)
*H01M 4/13* (2010.01)
*H01M 4/02* (2006.01)

(52) U.S. Cl.
USPC ............... 429/231.95; 429/231.9; 429/218.1; 429/209

(58) Field of Classification Search
None
See application file for complete search history.

(56) References Cited

U.S. PATENT DOCUMENTS

2005/0074671 A1    4/2005  Sugiyama et al.
2009/0162746 A1*   6/2009  Honda ...................... 429/133

FOREIGN PATENT DOCUMENTS

| JP | 2002-279974 | | 9/2002 | |
|---|---|---|---|---|
| JP | 2003-017040 | | 1/2003 | |
| JP | 2004-127561 | * | 4/2004 | .............. H01M 4/02 |
| JP | 2005-196970 | * | 7/2005 | .............. H01M 4/02 |
| JP | 2005-209533 | | 8/2005 | |
| WO | WO 2007/046322 | * | 4/2007 | .............. H01M 4/58 |
| WO | WO 2007/046322 A1 | | 4/2007 | |

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

A negative electrode 100 for a nonaqueous electrolytic secondary cell includes a current collector 1 and a plurality of active material bodies 2 formed on a surface of the current collector 1 at intervals; each active material body 2 contains a material for occluding or releasing lithium; and a plurality of projections 3 are formed on a part of a side surface of each active material body 2.

18 Claims, 13 Drawing Sheets

(a)

(b)

(c)

(a)

(b)

(a)

(b)

(c)

(a)

(b)

(a)

DISCHARGE (b)

CHARGE

NEGATIVE ELECTRODE FOR NONAQUEOUS ELECTROLYTE SECONDARY BATTERY

RELATED APPLICATIONS

This application is the U.S. National Phase under 35 U.S.C. §371 of International Application No. PCT/JP2007/069691, filed on Oct. 9, 2007, which in turn claims the benefit of Japanese Application Nos. 2006-276214, filed on Oct. 10, 2006, and 2006-290938, filed on Oct. 26, 2006, the disclosures of which Applications are incorporated by reference herein.

TECHNICAL FIELD

The present invention relates to a negative electrode for a nonaqueous electrolytic secondary cell.

BACKGROUND ART

Recently, mobile devices have become more and more compact and have been provided with many more functions. In accordance with this, it has been desired that cells used as power supplies of mobile devices have larger capacities. Nonaqueous electrolytic secondary cells including lithium ion secondary cells have features of being lightweight while having a high electromotive force and a high energy density. For these features, the demand for nonaqueous electrolytic secondary cells is increasing as driving power supplies of various mobile devices, for example, mobile phones, digital cameras, video cameras, notebook computers, various other mobile electronic devices and mobile communication devices.

A lithium ion secondary cell includes a positive electrode formed of a lithium-containing composite oxide, a negative electrode containing a negative electrode active material for occluding or releasing lithium metal, lithium alloy or lithium ions, and an electrolyte. Conventionally for the negative electrode active material of the lithium secondary cell, carbon materials are mainly used. Recently, it has been proposed to use a material which allows the cell to have a higher capacitance than the carbon materials. Examples of such a negative electrode active material include materials which occlude lithium ions and have a theoretical capacitance density higher than that of carbon of 372 mAh/g, for example, 833 mAh/cm$^3$ or higher. Such materials are, for example, elements such as silicon, (Si), tin (Sn), germanium (Ge), and oxides and alloys thereof. Among these materials, Si, which has a theoretical capacitance density of 4200 mAh/g and costs low, is especially considered promising. Many Si-containing materials, and structures of the Si-containing materials, have been studied.

However, where used as a negative electrode active material, an Si-containing material significantly expands and contracts as a result of occluding and releasing lithium when the cell is charged and discharged. For example, where Si is used as a negative electrode active material, Si is put into a state where a maximum possible amount of lithium ions is occluded ($Li_{4.4}Si$). In this state, the volume of Si is increased 4.12 times as compared to the volume when the cell is discharged (in the Si state).

Therefore, when a thin film containing a negative electrode active material such as Si, an oxide of silicon or the like (hereinafter, such a thin film will be referred to as an "active material layer") is deposited on a current collector by, especially, CVD, sputtering or the like to form a negative electrode, the following occurs. The active material layer expands and contracts as a result of occluding and releasing lithium ions, but the current collector hardly expands or contracts. Therefore, as the charge/discharge cycle is repeated, the closeness of the contact between the active material layer and the current collector is reduced. This may possibly cause the active material layer to be detached from the current collector. Or, in the case of a negative electrode for a wound type cell, when the negative electrode active material expands, the following may occur. The current collector may expand beyond the elastically deformable threshold, resulting in the wound electrode assembly buckling. Here, the term "buckle" refers to a phenomenon that the wound electrode assembly is locally depressed toward the center thereof or a part of the electrode assembly is deformed in a waving shape, due to the expansion thereof.

In order to solve the above-described problems caused by the expansion and contraction of the negative electrode active material, the following structure has been proposed: a plurality of column-shaped bodies containing a negative electrode active material (hereinafter, such a body will be referred to as an "active material body") are located on the current collector to form a space between adjacent active material bodies, so that the expansion stress of the negative electrode active material is alleviated.

For example, Patent Document 1 proposes the following: bumps and dents are provided on a surface of the current collector, and a film of a negative electrode active material is deposited thereon and etched, so that a space for separating the film of the negative electrode active material into minute areas is formed. Patent Document 2 proposes the following method: a mesh is located above the current collector and an active material layer is deposited through the mesh, so that the negative electrode active material is suppressed from being deposited on an area corresponding to the frame of the mesh. Patent Document 3 discloses forming a plurality of column-shaped active material bodies formed of a negative electrode active material such as Sn, Si or the like on the current collector. Patent Document 4 filed by the applicant of the present application proposes vapor-depositing a negative electrode active material on a surface of the current collector in a direction inclined with respect to the normal to the current collector (oblique vapor deposition), so that a plurality of active material bodies are grown in the direction inclined with respect to the normal to the current collector.

Patent Document 1: Japanese Laid-Open Patent Publication No. 2003-17040

Patent Document 2: Japanese Laid-Open Patent Publication No. 2002-279974

Patent Document 3: Japanese Laid-Open Patent Publication No. 2004-127561

Patent Document 4: Japanese Laid-Open Patent Publication No. 2005-196970

DISCLOSURE OF THE INVENTION

Problems to be Solved by the Invention

With the negative electrodes proposed in Patent Documents 1 through 4, when the active material bodies expand at the time of charge, the space between the active material bodies becomes very small. Therefore, the electrolytic solution in the space is squeezed out from the active material layer. As a result, the electrolytic solution retaining capability may be undesirably decreased.

For example, Patent Document 3 discloses an active material layer, in which cylindrical active material bodies (tin particles) having a height of 10 μm and a diameter of 20 μm are located at a pitch of 7 μm on a copper foil as the current collector. This active material layer is designed to have a space ratio of 0% when the cell is fully charged. The "space ratio of 0%" refers to a state where the active material layer is filled with expanded active material in the thickness direction of the active material layer when the cell is fully charged. Specifically, Patent Document 3 describes that "at the start of discharge, the entire space in the electrode is filled with the active material" as a result of the cylindrical tin particles expanding and thus being deformed. Since there is no space between the tin particles, the electrolytic solution originally existing between the tin particles is squeezed out, and so the electrolytic solution retaining capability is decreased. Accordingly, the ion conductivity is decreased by the shortage of the electrolytic solution, which increases the polarization of the electrode plates. This causes a problem that the rate characteristic is declined.

This problem is especially conspicuous where the column-shaped active material bodies are made wider (namely, the space between the active material bodies is made smaller) in order to increase the cell capacitance. It has been difficult to suppress the decline of the rate characteristic while guaranteeing a high cell capacitance.

Meanwhile, where the active material bodies are made higher in order to especially increase the cell capacitance, the tips of the active material bodies, which are not regulated by the current collector, largely expand as the cell is increasingly charged. As a result, the tips of adjacent active material bodies contact each other, and the electrolytic solution is occasionally confined in the space remaining in a bottom part between the active material bodies (in the vicinity of the surface of the current collector). In this case, lithium ions in the electrolytic solution confined in the space are suppressed from migrating at the start of discharge, which also declines the rate characteristic.

For these reasons, with the negative electrodes disclosed in Patent Documents 1 through 4, it is difficult to improve the discharge characteristic especially in an environment of high rate discharge or low temperature.

The present invention made in light of the above circumstances has an object of providing a negative electrode having a plurality of active material bodies located on a surface of a current collector, the negative electrode improving the charge/discharge characteristic while keeping the cell capacitance high.

Means for Solving the Problems

A negative electrode for a nonaqueous electrolytic secondary cell according to the present invention includes a current collector and a plurality of active material bodies formed on a surface of the current collector at intervals; each active material body contains a material for occluding or releasing lithium; and a plurality of projections are formed on a part of a side surface of each active material body.

According to the present invention, a plurality of projections are formed on a side surface of each active material body. Therefore, when the active material bodies occlude lithium and expand at the time of charge, adjacent active material bodies can be suppressed from contacting each other. As a result, a space for retaining an electrolytic solution can be secured between the active material bodies, and thus characteristics regarding the electrolysis can be improved. In an initial period of discharge, the expanded active material bodies can be prevented from inhibiting the migration of lithium ions. Therefore, a nonaqueous electrolytic secondary call having a high charge/discharge rate can be provided.

At the time of charge, an expansion stress applied on the surface of the current collector, which is generated by the active material bodies contacting and pushing each other, is alleviated. Therefore, the active material bodies can be suppressed from being detached from the current collector due to the expansion stress, and the current collector can be suppressed from being wrinkled. As a result, the charge/discharge cycle characteristic can be improved.

Effects of the Invention

The negative electrode for a nonaqueous electrolytic secondary cell according to the present invention can suppress adjacent active material bodies from contacting each other owing to projections formed on a side surface of each active material body. Therefore, a space for retaining the electrolytic solution can be secured between the active material bodies at the time of charge, and the expanded active material bodies can be prevented from inhibiting the migration of lithium ions in an initial period of discharge.

At the time of charge, the stress applied on the surface of the current collector by the contact of the active material bodies can be alleviated. Therefore, the current collector can be suppressed from being wrinkled or deformed.

DESCRIPTION OF THE REFERENCE NUMERALS

Figure 1:
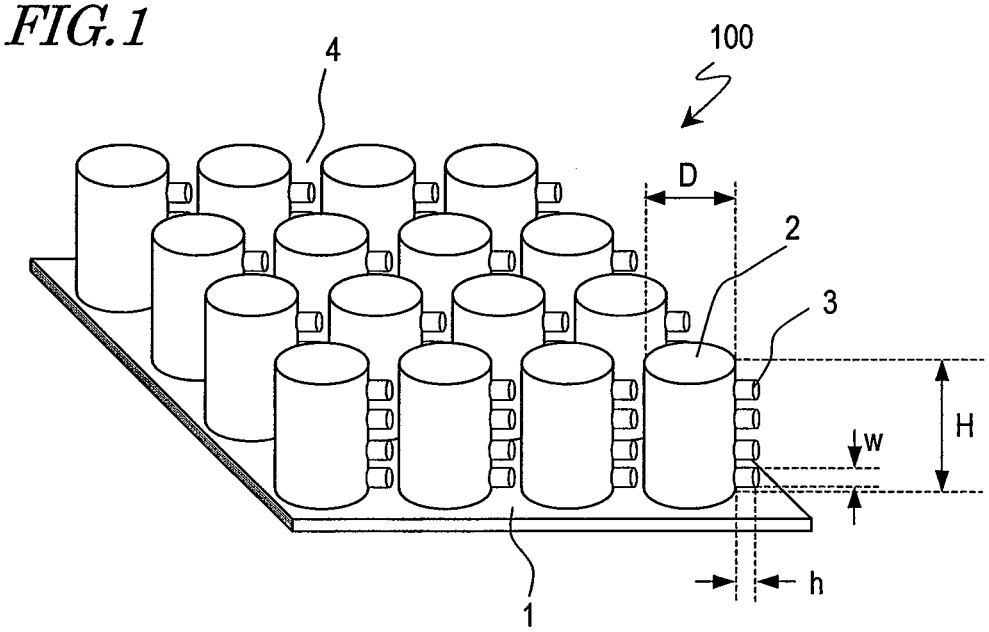
FIG. 1 is a perspective view schematically showing a negative electrode in Embodiment 1 according to the present invention.

1 Current collector
2 Active material body
3 Projection
4 Space
5 Bump
6 Dent
100, 200, 300 Negative electrode
11 Positive electrode
11a Aluminum foil
11b Positive electrode active material layer
12 Negative electrode
12a Copper foil
12b Negative electrode active material layer
13 Separator
14 Outer case
15 Positive electrode lead
16 Negative electrode lead
17 Thermal seal agent
21 Chamber
22 Stage
24 Mask
61 Negative electrode
61a Negative electrode lead
62 Positive electrode
62a Positive electrode lead
63 Separator
64 Electrode assembly
65 Cell case
66 Sealing plate
67 Insulating gasket
70a, 70b Insulating plate
41 Take-up roll
42 Mask
43a, 43b Vaporization source
44a, 44b Film forming roll
45 Supply roll
46 Vacuum container

BEST MODE FOR CARRYING OUT THE INVENTION

Embodiment 1

Hereinafter, a Negative Electrode for a Nonaqueous electrolytic secondary cell (hereinafter, referred to simply as a "negative electrode") in Embodiment 1 according to the present invention will be described with reference to the figures.

FIG. 1 is a schematic perspective view of a negative electrode in this embodiment. The negative electrode 100 includes a current collector 1 formed of a copper foil or the like and a plurality of active material bodies 2 located at intervals on the current collector 1. A space 4 is formed between adjacent active material bodies 2. Each active material body 2 is column-shaped and has a plurality of projections 3 formed on a part of a side surface thereof. In this embodiment, it is preferable that at least a part of the plurality of projections 3 of each active material body 2 is formed on a part of the surface facing an active material body adjacent thereto. In FIG. 1, the projections 3 are arranged in a straight line on the side surface of each active material body 2 for the same of simplicity, but the projections 3 may be located randomly on the side surface.

In this embodiment, for example, the active material body 2 is generally cylindrical and has a diameter D of 10 μm, a height H of 18 μm, and an average pitch of 18 μm between two adjacent active material bodies 2. The plurality of projections 3 includes at least one generally cylindrical projection having a width (here, diameter) w of 1 μm and a height h of 1 μm. In FIG. 1, the active material bodies 2 and the projections 3 are all column-shaped (here, cylindrical), but the shape of these elements is not limited to being cylindrical. In addition, the active material bodies 2 and the projections 3 do not need to have a uniform shape or size.

The active material bodies 2 are formed of a material for occluding or releasing lithium. In this embodiment, the active material bodies 2 contain, for example, an oxide of silicon ($SiO_x$) and largely expand upward and laterally when occluding lithium. Herein, "laterally" refers to any direction in a plane parallel to the surface of the current collector 1, and "upward" refers to a direction from the surface of the current collector 1 toward a top surface of the active material bodies 2 along the normal to the current collector 1.

In this embodiment, when the active material bodies 2 occlude lithium and so expand, the projections 3 formed on the side surface of each active material body 2 suppress the lateral expansion of the active material body 2. Therefore, a space for retaining an electrolytic solution can be secured between adjacent active material bodies 2 as described below in detail. Owing to this, a lithium secondary cell produced using the negative electrode 100 provides advantages of improving the electrolytic solution retaining characteristic as compared with the conventional art and so improving the rate characteristic.

FIGS. 2(a) and (b) are respectively plan views schematically showing two adjacent active material bodies 2 in the negative electrode 100 when the lithium secondary cell is discharged and charged. In the example shown here, the projections 3 are located randomly on a left part of the side surface of each cylindrical active material body 2. FIG. 2(c) is a plan view schematically showing three adjacent active material bodies 3 in a conventional negative electrode when the cell is charged.

As shown in FIG. 2(a), when the cell is discharged, a space between these active material bodies 2 is d1. When the cell is charged, as shown in FIG. 2(b), the space becomes smaller due to the lateral expansion of the active material bodies 2. The projections 3 located in a part of the side surface facing the adjacent active material body 2 collide against the surface of the adjacent active material body 2 and act as a stopper. Therefore, these adjacent active material bodies 2 do not contact each other and the space 4 remains between these active material bodies 2. The size of a space d2 (0<d2<d1) between the active material bodies 2 in this state varies depending on the shape or size of the projections acting as the stopper, among the plurality of projections 3, and is, for example, 0.5 μm or greater. Accordingly, even in a fully charged state or in an almost fully charged state, a prescribed amount of electrolytic solution can be retained in the space 4 remaining between the active material bodies 2. This can suppress the polarization from increasing.

By contrast, in the conventional negative electrode, the active material bodies have no projections on a side surface thereof. Therefore, as shown in FIG. 2(c), the side surfaces of adjacent active material bodies 2' contact one another and the space is completely filled with the active material bodies 2'. As a result, the electrolytic solution existing in the space between the active material bodies 2' when the cell is discharged is squeezed out upward. This increases the polarization and declines the rate characteristic. Even when the space is filled with the active material bodies 2' as seen from above the current collector 1, a bottom part of the space between the active material bodies 2' occasionally remains (in the vicinity of the current collector 1). However, even in such a case, the electrolytic solution is confined in the remaining space. This makes it difficult for the lithium ions in the electrolytic solution to migrate toward the positive electrode in an initial period of discharge, which may undesirably decline the rate characteristic.

As described above, in this embodiment, the plurality of projections 3 have a function of suppressing the lateral expansion of the active material bodies 2 at the time of charge to suppress the adjacent active material bodies 2 from contacting each other. In this embodiment, it is preferable that at least a part of the plurality of projections 3 is located in a part of the side surface of each active material body 2 facing the adjacent active material body 2. This further ensures that the active material bodies 2 are suppressed from contacting each other and guarantees that the space 4 between the active material bodies 2 is sufficient. In FIG. 1, for the sake of simplicity, the plurality of projections 3 are cylindrical and schematically shown as having substantially the same diameter (width) w and height h. Even where the shape or size (height h, width w, etc.) of the projections 3 is not uniform, the above-described function can be provided.

In this specification, the height h and the width w of the projections 3 are defined as follows. FIG. 3(a) is a cross-sectional view showing examples of projections 3 having various shapes. FIG. 3(a) shows a state where the active material body 2 has been formed but has not yet occluded lithium. In the example shown here, the active material body 2 is column-shaped and is inclined with respect to the normal to the current collector 1.

First, as shown in the figure, a side surface 7 of the active material body 2 is defined as a part thereof where the projections 3a, 3b and 3c are not formed. For each projection 3a, 3b, 3c, the highest point from the side surface 7 is the apex. A distance $h_1$, $h_2$, $h_3$ between the apex and the side surface 7 is the "height h" of the projection 3a, 3b, 3c.

Now, the width of the projection will be defined regarding the projection 3b shown in FIG. 3(a). FIG. 3(b) is a cross-sectional view of the projection 3b parallel to the side surface 7. Where $h_2$ is the height of the projection 3b, the cross-sectional view is taken at a middle height $h_2/2$. FIG. 3(b) shows a state where the active material body 2 has been formed but has not yet occluded lithium. As shown in the figure, the maximum width $w_2$ in the cross-section of the projection 3b is the "width w" of the projection 3b. Accordingly, where the cross-section of the projection 3b is generally circular, the diameter thereof is the width w.

In order to allow the projection 3 to provide the above-described function of suppressing the lateral expansion more effectively, the width w of the projection 3 is preferably 0.5 μm or greater. Where the width w of the projection 3 is too small, the projection 3 may be broken by a force generated by the expansion of the active material body 2. By contrast, where the width w of the projection 3 is too large, the ratio of the projections 3 themselves in the space 4 is too high to guarantee a sufficient space ratio. Accordingly, the upper limit of the width w of the projection 3 is preferably, for example, 5 μm or smaller although this depends on the height h of the projection 3.

Where the height h of the projection 3 is too small, a sufficient space ratio is not guaranteed at the time of charge. Therefore, the height h of the projection 3 is preferably, for example, 0.5 μm or greater. Where the height h of the projection 3 is too large, the active material body mainly expands upward (height direction of the active material body 2) at the time of charge. As a result, the height H of the active material body 2 (the thickness of the active material layer formed of the active material bodies 2) at the time of charge becomes too large and so the capacitance per volume of the cell is reduced. Therefore, the height h of the projection 3 is preferably, for example, 5 μm or smaller.

Figure 2:
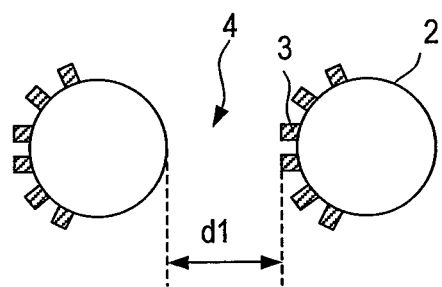
FIGS. 2(a) and (b) are provided for explaining expansion and contraction of the negative electrode in Embodiment 1 caused by charge and discharge, and are respectively enlarged plan views schematically showing two adjacent active material bodies at the time of charge and at the time of discharge.
FIG. 2(c) is an enlarged plan view schematically showing three adjacent active material bodies of a conventional negative electrode at the time of charge.
Figure 2:
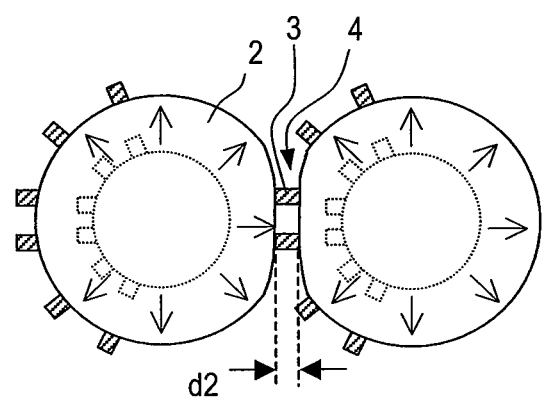
Figure 2:
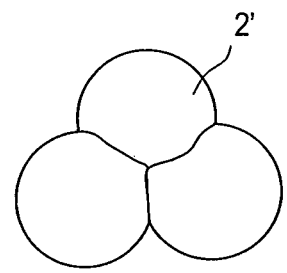
Figure 3:
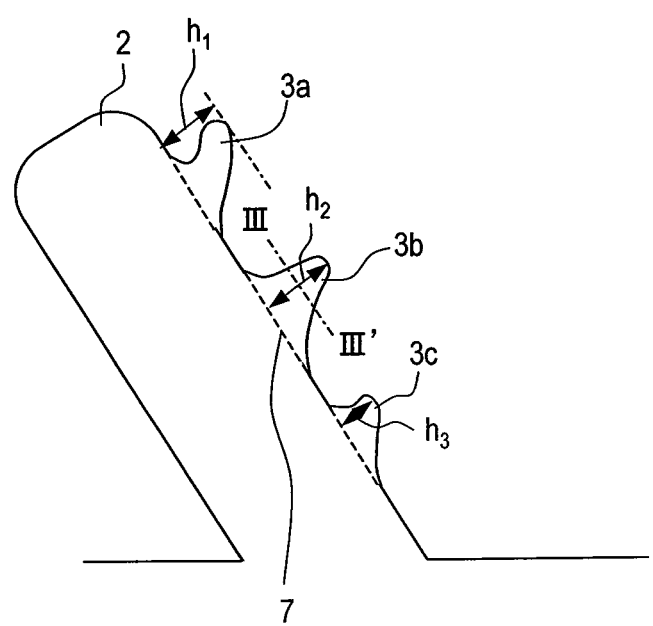
FIGS. 3(a) and (b) are provided for explaining the definition of the height h and the width w of projections formed on the active material body; (a) is a cross-sectional view vertical to a current collector, and (b) is a cross-sectional view parallel to a side surface of the active material body.
Figure 3:
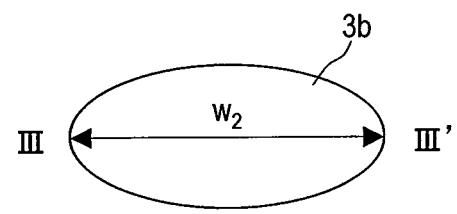

As described above, the shape or size of the plurality of projections 3 formed on the side surface of each active material body 2 may be non-uniform. In such a case, as long as at least a part of the projections 3 has the above-described range of width w and height h, a sufficient effect can be provided. In FIG. 1 through FIG. 3, the plurality of projections 3 are concentrated in one part of the side surface of each active material body 2 to form a projection group. Such a projection group may be formed at a plurality of positions of each active material body 2. Alternatively, the projections 3 may be formed in the entire side surface of each active material body 2.

In this embodiment, the active material bodies 2 and the projections 3 contain an oxide of silicon as a material for occluding or releasing lithium. Where the composition of the oxide of silicon contained in the active material bodies 2 is $SiO_x$, an average value $x_{AVE}$ of the molar ratio x of the amount of oxygen with respect to the amount of silicon (hereinafter, referred to simply as the "oxygen ratio") is, for example, 0.5. Where the composition of the oxide of silicon contained in the projections 3 formed on the active material bodies 2 is $SiO_y$, the oxygen ratio y is, for example, 1.8.

The compositions of the active material bodies 2 and the projections 3 are not limited to the above. In order to allow the projections 3 to provide the expansion suppressing effect described above with reference to FIG. 2 more effectively, it is preferable that the oxygen ratio y of the projections 3 is higher than the average value $x_{AVE}$ of the oxygen ratio of the active material bodies 2 ($y > x_{AVE}$). Generally with an oxide of silicon ($SiO_x$, $SiO_y$), as the oxygen ratio x, y is lower, the ion occluding capability is higher and so the charge/discharge capacitance can be increased, but the volume expansion ratio by the charge is also increased. By contrast, as the oxygen ratio x, y is higher, the ion occluding capability is lower and so the volume expansion ratio is suppressed, but the charge/discharge capacitance is also decreased. By controlling the oxygen ratios x and y as described above, it is made possible to suppress the expansion of the projections 3 at the time of charge to form the space 4 for retaining the electrolytic solution between the active material bodies 2 more certainly, while guaranteeing a certain degree of charge/discharge capacitance.

Where the oxygen ratio y of the projections 3 is too small, the projections 3 themselves may undesirably expand largely to fill the space 4. Therefore, it is preferable that the oxygen ratio y is selected from a range at which the expansion amount caused by the occlusion of lithium is sufficiently small. For example, the oxygen ratio y is 1.5 or greater and 2 or smaller ($1.5 \leq y \leq 2$).

The average value $x_{AVE}$ of the oxygen ratio of the oxide of silicon ($SiO_x$) contained in the active material bodies 2 may be greater than 0 and smaller than 2 ($0 < x_{AVE} < 2$). The average value $x_{AVE}$ of the oxygen ratio is preferably 0.6 or smaller ($x_{AVE} \leq 0.6$) in order to provide a higher capacitance while suppressing the thickness of the active material particles 4. Where the average value $x_{AVE}$ of the oxygen ratio is smaller than 0.1, the active material bodies 2 largely expand at the time of charge and the projections 3 may be broken depending on the size (e.g., the width w) of the projections 3. When this occurs, the projections 3 may not provide a sufficient expansion suppressing effect. Therefore, the average value $x_{AVE}$ of the oxygen ratio is preferably 0.1 or greater ($0.1 \leq x_{AVE}$). The average value $x_{AVE}$ of the oxygen ratio is more preferably 0.2 or greater ($0.2 \leq x_{AVE}$) in order to further suppress the volume expansion of the active material bodies 2 and to effectively suppress the expansion of the active material bodies 2 even where the size of the projections 3 is small (for example. the width w of each projection 3 is about 1.0). This is advantageous because this makes it unnecessary to form especially large projections 3.

The material of the active material bodies 2 is not limited to an oxide of silicon, and may be any material which can occlude and release lithium and expands and contracts at the time of occlusion and release. Specifically, single body elements such as silicon, tin and the like, and alloys and compounds thereof are usable. The projections 3 do not need to be formed of a material capable of occluding or releasing lithium, and may be formed of an oxide or a metal which hardly occlude or release lithium, such as silicon dioxide ($SiO_2$) or the like.

Now, the structure of a negative electrode according to the present invention and a method for producing the same will be described more specifically by way of examples.

Example 1-1

Production of a Negative Electrode

In Example 1-1, a plurality of active material bodies are formed on a surface of a current collector by performing vapor deposition in a direction inclined with respect to the normal to the current collector (oblique vapor deposition), and thus a negative electrode is produced. Hereinafter, a method for producing a negative electrode in Example 1-1 will be described with reference to the figures.

Figure 4:
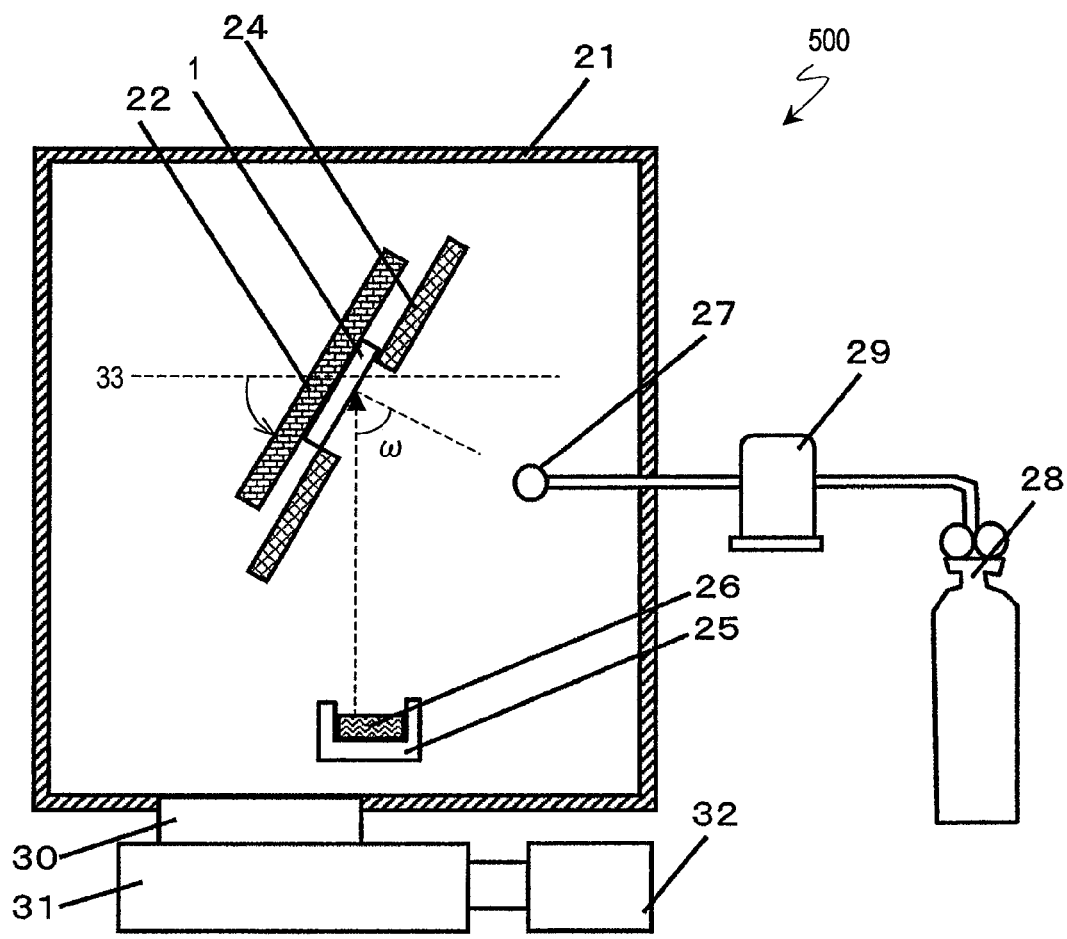
FIG. 4 is a schematic cross-sectional view of a vapor deposition device used for forming the active material bodies.

First, a vapor deposition device used for forming the active material bodies will be described. FIG. 4 is a cross-sectional view schematically showing a vapor deposition device used in this example.

The vapor deposition device 500 includes a chamber 21, a vacuum pipe 30 for exhausting the interior of the chamber 21, an oil diffusion pump 31, and an oil rotation pump 32. The chamber 21 accommodates a nozzle 27 for supplying oxygen gas to the chamber 21, a stage 22 for fixing the current collector, a crucible 25 (for example, formed of carbon), located vertically below the stage 22, for accommodating a vapor-depositing material, and a mask 24, located between the stage 22 and a top surface of the vapor-depositing material (vapor-depositing surface) which is accommodated in the crucible 25, for regulating an incidence direction of the vapor-depositing material with respect to a surface of the current collector (hereinafter, this direction will be referred to as a "vapor deposition direction"). The nozzle 27 is connected to a tank 28 via a mass flow controller 29.

In Example 1-1, the active material bodies 2 were formed using the above-described vapor deposition device 500 in the following method.

First, a surface-roughened copper foil having a thickness of 35 μm and a surface roughness $R^a$ of 2 μm (produced by Furukawa Circuit Foil Co., Ltd.) was attached as the current collector 1 on the stage 22 of the vapor deposition device 500. In the crucible 25, silicon 26 having a purity of 99.999% (produced by Kojundo Chemical Lab. Co., Ltd.) was set. In order to control the vapor deposition direction, the stage 22 was located such that a surface thereof would be inclined by a prescribed angle (here, 60 degrees) with respect to a plane 33 parallel to a top surface (vapor-depositing surface) of the silicon 26. The position of the mask 24 was adjusted such that incidence angle ω of silicon with respect to the current collector 1 would be 60 degrees. The "incidence angle ω" refers to an angle made by the incidence direction of the vapor-depositing material (here, silicon) with respect to the current collector 1 and the normal to the current collector 1. Then, the interior of the chamber 21 was exhausted to have a degree of vacuum of 0.007 Pa by the oil diffusion pump 31 and the rotation pump 32 via the vacuum pipe 30.

Next, the silicon 26 was heated using an electron beam (not shown) while oxygen gas having a purity of 99.7% (produced by Nippon Sanso Kabushiki Kaisha) was introduced into the chamber 21 via the nozzle 27 to perform vapor deposition. The flow rate of the oxygen gas was controlled to be 2 SLM (standard liter/min.; flow rate per minute at 1 atm. and 0° C.) by the mass flow controller 29, which stabilized the degree of vacuum inside the chamber 21 at 0.03 Pa. Regarding the electron beam for irradiating the crucible 25 accommodating the silicon 26, the acceleration voltage was set to −30 kV and the emission voltage was set to 1100 mA. In this example, the film formation time (vapor deposition time) was set to 100 seconds.

During the vapor deposition step, silicon atoms vaporized from the silicon 26 and the oxygen gas output from the nozzle 27 reacted with each other on the surface of the current collector 1, and an oxide of silicon was grown (reactive vapor deposition). At this stage, the silicon atoms were likely to be vapor-deposited on bumps (protrusions) of the current collector (surface-roughened copper foil) 1. Therefore, the oxide of silicon was selectively grown to be column-shaped on the bumps. Also on the surface of the current collector 1, shadowed areas were generated. These areas were shadowed by the bumps and the oxide of silicon growing to be column-shaped, and silicon atoms were not incident, and thus the oxide of silicon was not vapor-deposited, on these areas (the generation of such areas is called "shadowing effect"). As a result, on the surface of the current collector 1, the oxide of silicon was grown at intervals in accordance with the bumps and dents of the surface. Thus, the plurality of active material bodies 2 were obtained. The growth direction of the active material bodies 2 was determined by the incidence direction of the silicon atoms, and was inclined with respect to the normal to the current collector 1.

In this manner, the negative electrode 2 including the plurality of active material bodies 2 on the current collector 1 was obtained.

Figure 5:
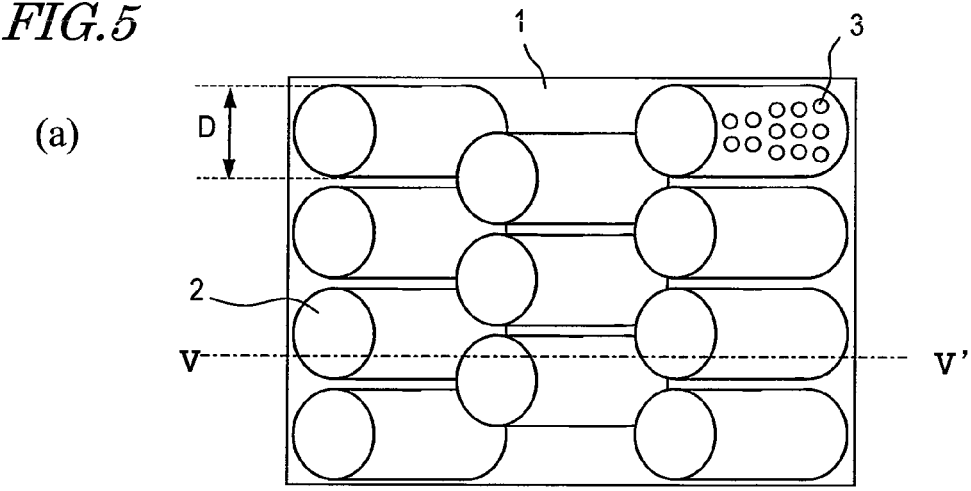
FIGS. 5(a) through (c) are provided for explaining a structure of a negative electrode in Example 1-1; (a) is a schematic perspective view of the negative electrode, (b) is a schematic cross-sectional view taken along a plane which is vertical to the current collector and includes the vapor deposition direction, and (c) is an SEM photograph of a cross-section of the negative electrode.
Figure 5:
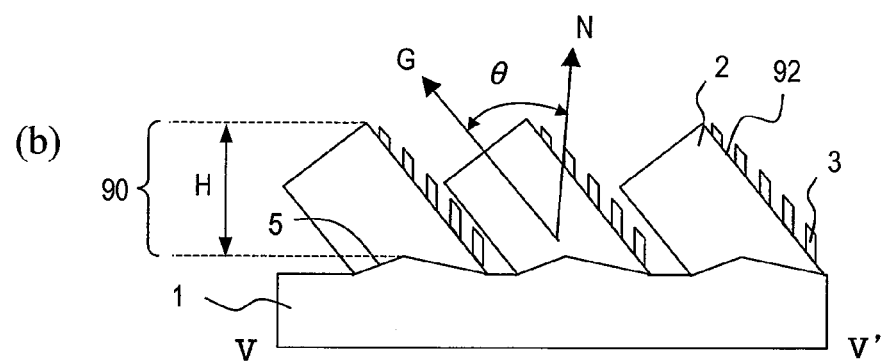
Figure 5:
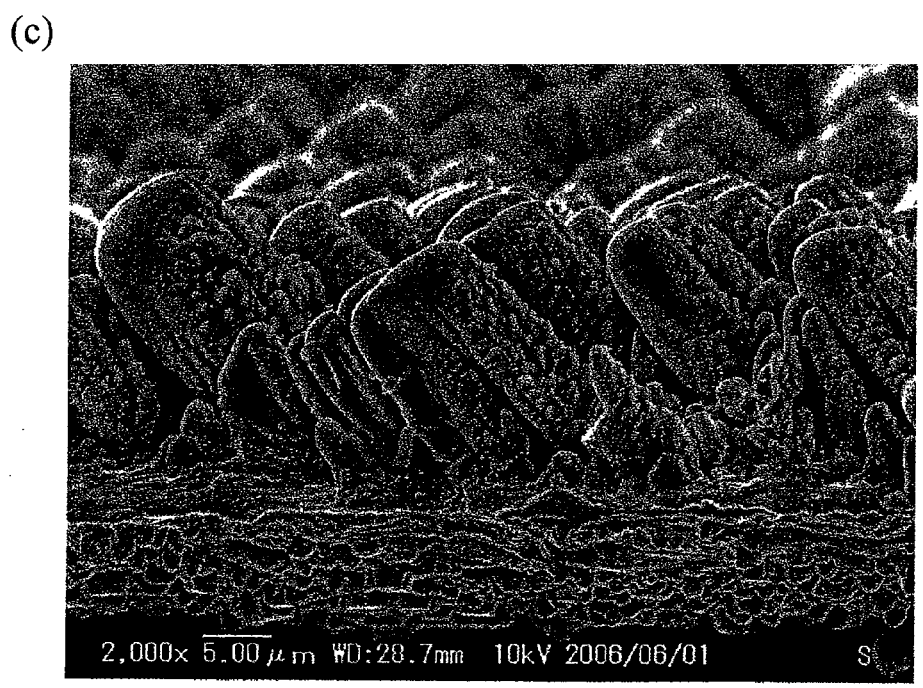

FIGS. 5(a) and (b) are schematic views provided to explain a structure of the negative electrode in Example 1-1 obtained by the above-described method. FIG. 5(a) is a perspective view of the negative electrode. FIG. 5(b) is a cross-sectional view of the negative electrode taken along a plane which is vertical to the current collector 1 and includes the vapor deposition direction. FIG. 5(c) is an SEM photograph of a cross-section of the negative electrode.

As seen from FIGS. 5(a) through (c), an active material film 90 including the plurality of active material bodies 2 is formed on the current collector 1. The surface of the current collector 1 has the bumps and dents, and each bump has an active material body 2 formed thereon. Each active material body 2 has a growth direction G inclined with respect to the normal N to the current collector 1. On an upper part of a side surface of each active material body 2, namely, the part farther from the surface of the current collector 1 (hereinafter, this part will be referred to as an "upper side surface part") 92, a plurality of projections 3 are formed. In this example, the projections 3 formed in a bottom part of the upper side surface part 92 of each active material body 2 have a larger width w and a larger height h than those of the projections 3 formed in a top part of the upper side surface part 92 of the same active material body 2. In the plan view of FIG. 5(a), the projections 3 are shown only on a surface of one active material body 2. In actuality, substantially the same projections 3 are formed on the surface of the other active material bodies 2.

Next, based on the SEM photograph of the cross-section shown in FIG. 5(c), the size of the active material body 2 was found. A top surface of the active material body 2 was generally circular, and the diameter D thereof was 6 to 11 μm. The height H of the active material body 2 along the normal to the current collector 1 (height from a top surface of the bump 5) was 15 to 18 μm. The projections 3 included projections having a width w of 1.0 to 1.4 μm and a height h of 1.0 to 2.8

Next, the compositions of the active material body and the projection 3 were analyzed by a wavelength dispersive fluorescence spectrometer. The composition of the active material body 2 was $SiO_x$ ($0.4 \leq x_{AVE} \leq 0.6$; $x_{AVE}$ is an average value of the oxygen ratio of the active material bodies 2). The composition of the projection 3 was $SiO_y$ ($1.5 \leq y \leq 2$).

<Production and Evaluation of a Test Cell>

Figure 6:
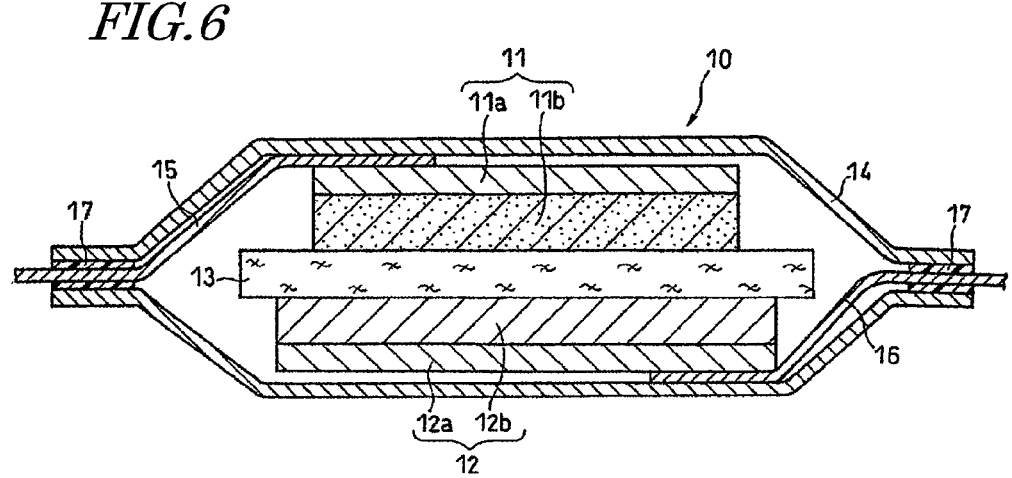
FIG. 6 is a schematic cross-sectional view of a test cell produced using the negative electrode in Example 1-1.

Using the negative electrode in Example 1-1 produced in the above-described method, a stacking type lithium secondary type as shown in FIG. 6 was produced as a test cell, and the electrolytic solution retaining capability of the obtained test cell was examined. The method and results will be described.

(i) Production of a Positive Electrode 10 g of lithium cobalt oxide ($LiCoO_2$) powder having an average particle diameter of about 10 μm as a positive active material, 0.3 g of acetylene black as a conductor, 0.8 g of poly(vinylidene fluoride) as a binder, and an appropriate amount of N-methyl-2-pyrrolidone (NMP) were sufficiently mixed to prepare a positive electrode material paste. The obtained paste was applied to one surface of an aluminum foil 11a having a thickness of 20 μm, dried and rolled to form a positive electrode material layer 11b having a thickness of 50 μm. Then, the assembly of the aluminum foil 11a and the positive electrode material layer 11b was cut into a size of 30 mm×30 mm to form a positive electrode 11. An end of the layer of the positive electrode 11 which does not have the active electrode material layer 11b, i.e., an end of the aluminum foil 11a was connected to a positive electrode lead 15.

(ii) Production of a Negative Electrode for a Test Cell

On the negative electrode in Example 1-1, lithium metal was vapor-deposited by a resistance heating vapor deposition device. The lithium metal was vapor-deposited in an amount for compensating for the irreversible capacitance generated by the first cycle of charge/discharge. The irreversible amount was found by producing a model cell using the negative electrode and a lithium foil as a counter electrode and performing one cycle of charge/discharge. Specifically, the irreversible amount is found as follows. In a constant temperature bath of 20° C., the model cell is charged by flowing a constant current of 0.1 C (1 C represents the current value when all the cell capacitance is used up in 1 hour) until a voltage of the negative electrode relative to the lithium foil becomes 0 V. After a recess of 30 minutes, the cell is discharged by a constant current of 0.1 C until a voltage of the negative electrode becomes +1.5 V. The irreversible amount is a difference between the capacitance when the voltage of 0 V is obtained and the capacitance when the voltage of +1.5 V is obtained. In this manner, a negative electrode 12 for a test cell including a copper foil 12a as a negative electrode current collector and a negative electrode material layer 12b compensated for the irreversible amount was obtained.

Then, the negative electrode 12 for the cell was cut into a size of 31 mm×31 mm, and an end of the layer of the negative electrode 12 which does not have the negative electrode active material layer 12b, i.e., an end of the copper foil 12 was connected to a negative electrode lead 16.

(iii) Production of the Test Cell

The positive electrode active material layer 11b and the negative electrode active material layer 12b were located to face each other while holding a separator 13 therebetween to form an electrode plate assembly. The separator 13 was formed of a polyethylene microporous film having a thickness of 20 μm (produced by Asahi Kasei Corporation). The electrode plate assembly was inserted into an outer case 14 formed of an aluminum laminate sheet. An electrolytic solution was obtained by mixing ethylene carbonate and ethylmethyl carbonate at a volume ratio of 1:1 and mixing $LiPF_6$ at a concentration of 1.0 mol/L with the resultant substance, and was put into the outer case 14. The positive electrode active material layer 11b, the negative electrode active material layer 12b and the separator 13 were impregnated with the electrolytic solution. After this, in the state where the positive electrode lead 15 and the negative electrode lead 16 were introduced outside the outer case 14, a thermal seal agent 17 was held at ends of the outer case 14 and thermally fused while the pressure inside the outer case 14 was reduced to vacuum. The electrode plate assembly was pressurized by a force of 30 kg applied to a flat metal plate (not shown) placed on the outer case 14. Thus, a cell was completed. The obtained cell is labeled as "test cell A".

(iv) Charging of the Test Cell and Measurement of the Space Ratio

The produced test cell A was accommodated in the constant temperature tank of 20° C. and charged with a constant current of a rate of 1 C until the cell voltage became 4.2 V. After the cell voltage reached 4.2 V, the test cell A was charged by a constant voltage until the current value became 0.05 C. Thus, the cell was fully charged. Next, the outer case 14 was cut open by scissors, the content of the test cell 1A was removed, and then the electrode plate assembly was separated into the positive electrode 11, the negative electrode 12 and the separator 13. Next, the negative electrode 12 was removed from the electrode plate assembly and immersed in a diethyl carbonate solution to wash out the electrolytic solution attached to the negative electrode 12. After the negative electrode 12 was sufficiently dried, a negative electrode plate of the negative electrode 12 was cut out from a central part thereof into a circle having a diameter of 12.5 mm. The weight and the thickness of the active material film were measured. Here, the "active material film" refers to the film 90 including the plurality of active material bodies 2 as described above with reference to FIG. 5. The "thickness of the active material film" typically corresponds to an average value of the thicknesses H of the active material bodies 2.

The weight of the active material film was found by measuring the total weight of the active material film and the copper foil by an electronic scale and subtracting the weight of the copper foil, separately found, from the total weight. The thickness of the active material film was found by measuring the sum (total thickness) of the thickness of the active material film and the thickness of the copper foil (current collector) 1 by a thickness gauge, and subtracting the thickness of the copper foil 1, separately found, from the total thickness. As a result, the total weight was 42.5 mg, the weight of the copper foil was 37.5 mg, the weight of the active material film was 5.0 mg, the total thickness was 73.5 µm, the thickness of the copper foil was 46.0 µm, and the thickness of the active material film was 27.5 µm. The volume of the active material film calculated from these results was $3.37 \times 10^{-9}$ m$^3$.

Next, the electrolytic solution was dropped only onto the active material film side of the negative electrode plate to sufficiently infiltrate the electrolytic solution into the active material film. After the surface was lightly wiped, the weight of the active material film was measured again. The volume of the electrolytic solution infiltrated into the active material film, which was found based on the specific gravity of the electrolytic solution (=1.2), was $8.58 \times 10^{-10}$ m$^3$. The volume of the infiltrated electrolytic solution corresponds to the space in the active material film. Accordingly, it was found from the following expression that the ratio of the space with respect to the active material film (space ratio) was 17.5%.

(Volume of the infiltrated electrolytic solution)/(volume of the active material film)×100

Comparative Example 1-1

Production of a Negative Electrode

Active material bodies were formed on the surface of the current collector by substantially the same method as that of Example 1-1 except that the acceleration voltage of the electronic beam was −8 kV, the emission current was 200 mA, the introduction amount of oxygen gas was 20 SCCM (standard cc/min.; flow rate per minute at 1 atm. and 0° C.) and the film formation time was 50 minutes. For the formation of the active material bodies, the vapor deposition device 500 shown in FIG. 4 was used. The degree of vacuum in the chamber 21 was 0.01 Pa before the introduction of oxygen gas and 0.03 Pa during the film formation, namely, after the introduction of oxygen gas. In this manner, a negative electrode in Comparative example 1-1 was obtained.

Figure 7:
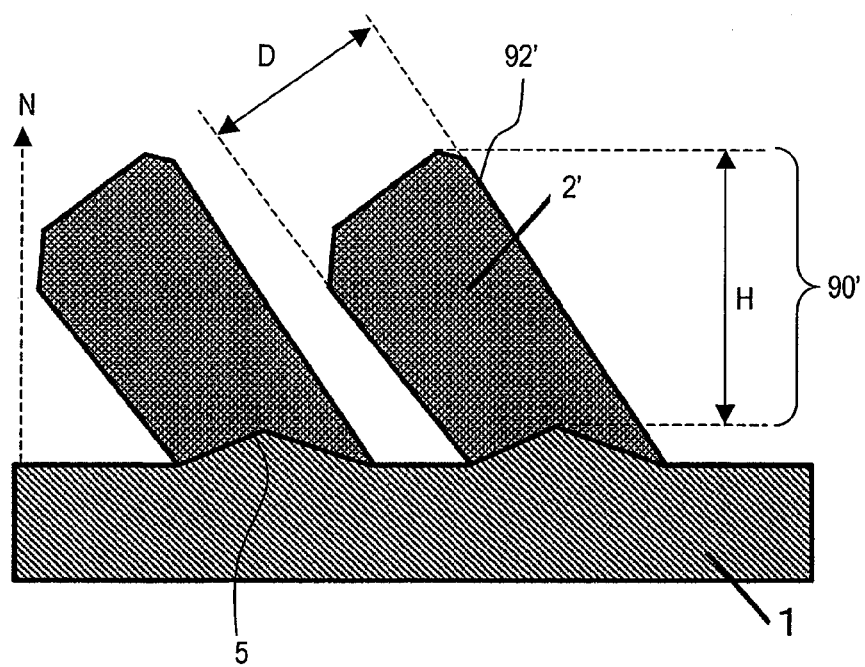
FIG. 7 is a cross-sectional view schematically showing a negative electrode in Comparative example 1-1.

FIG. 7 schematically shows the negative electrode in Comparative example 1-1, and is a cross-sectional view thereof taken along a plane which is vertical to the current collector and includes the vapor deposition direction. As seen from FIG. 7, an active material film 90' including a plurality of active material bodies 2' is formed on the surface of the current collector 1. Bumps and dents are formed on the entire surface of the current collector (copper foil) 1, and each bump 5 has one active material body 2' formed thereon. The active material bodies 2' are inclined with respect to the normal N to the current collector 1. A top surface of each active material body 2' was generally circular, and the diameter D thereof was 6 to 11 µm. The height H of the active material body 2' was 15 to 18 µm. On an upper side surface part 92' of each active material body 2', no projection having a width w or a height h of 1 µm or greater was seen.

The reason why the projections were not formed on the active material bodies 2 in Comparative example 1-1 is considered to be related to the formation conditions of the active material film, especially, the growth rate of the active material bodies 2 and the introduction amount of oxygen gas. The growth rate of the active material bodies 2 calculated from the height H thereof is 5 to 6 nm/sec. in Comparative example 1-1, but is 150 to 180 nm/sec. in Example 1-1 described above, which is about 30 times as high as that of Comparative example 1-1. The introduction amount of oxygen gas is 20 SCCM in Comparative example 1-1, but is 2 SLM in Example 1-1, which is about 100 times as large as that of Comparative example 1-1. Hence, it is considered that when the growth rate of the active material bodies 2 and the introduction amount of oxygen gas are both significantly increased (for example, by 10 times), the linearity of the advancement of the particles to be vapor-deposited (here, silicon particles) is reduced, which promotes the formation of the projections on the side surface of the active material bodies 2.

<Production and Evaluation of a Test Cell>

Using the negative electrode in Comparative example 1-1 produced in the above-described method, a test cell B was produced. The structure and the production method of the test cell were substantially the same as in Example 1-1.

Next, the space ratio of the negative electrode in a fully charged state of the test cell B was measured by substantially the same method as in Example 1-1. The results of measurement of the weight and the thickness of the active material plate cut out into a prescribed size were as follows. The total weight was 42.7 mg, the weight of the copper foil was 37.2 mg, the weight of the active material film was 5.5 mg, the total thickness was 78.0 µm, the thickness of the copper foil was 46.8 µm, and the thickness of the active material film was 31.2 µm. The volume of the active material film calculated from these results was $3.83 \times 10^{-9}$ m$^3$. The volume of the infiltrated electrolytic solution was $4.68 \times 10^{-10}$ m$^3$. Accordingly, the space ratio of the active material film was 12.2%.

Embodiment 2

Hereinafter, a negative electrode in Embodiment 2 according to the present invention will be described with reference to the figures. Unlike in Embodiment 1, in this embodiment, a plurality of stages of vapor deposition are performed while the vapor deposition direction is varied, so that active material bodies are grown zigzag on the surface of the current collector.

Figure 8:
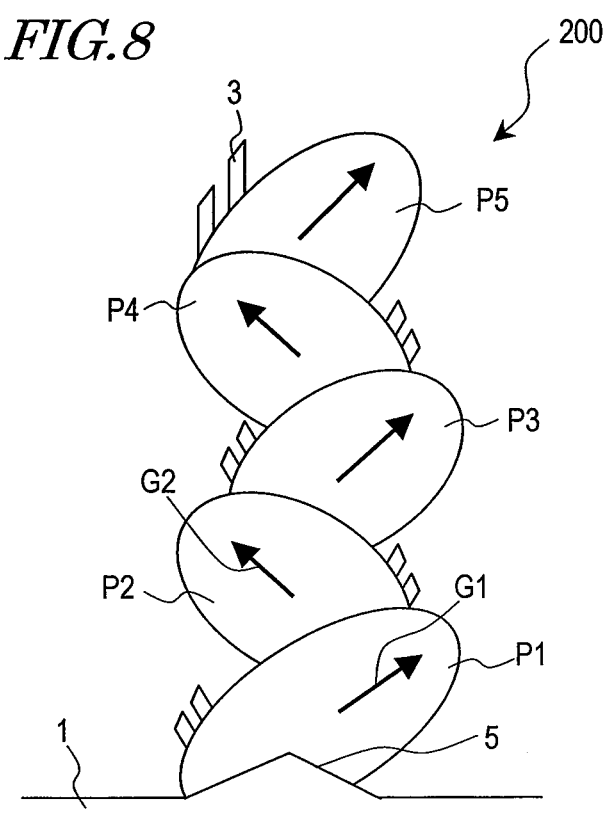
FIG. 8 is a cross-sectional view schematically showing a negative electrode in Embodiment 2 according to the present invention.

FIG. 8 schematically shows a negative electrode in this embodiment, and is a cross-sectional view thereof taken along a plane which is vertical to the current collector and includes the vapor deposition direction. The negative electrode 200 includes the current collector 1 having bumps and dents on the surface thereof, and an active material body 2 formed on each bump 5. The active material body 2 has a structure in which first through fifth parts p1 through p2 are stacked in this order (the stacking number n:5). The growth direction of the first, third and fifth parts p1, p3 and p5 and the growth direction of the second and fourth parts p2 and p3 are inclined in the opposite directions to each other with respect to the normal to the current collector 1. The active material body 2 has a plurality of projections 3 on a side surface thereof.

In this embodiment, the projections 3 are formed an upper side surface part of each of the parts p1 through p5 of the active material body 2. Therefore, in the cross-section shown in the figure, the projections 3 are located alternately on both side surfaces of the active material body 2 from the bottom surface to the top surface of the active material body 2. The width and height of the projections 3 located on the uppermost layer (here, the fifth part p5) of the active material body 2 are larger than those of the projections 3 located on the lower layers (here, the first through fourth parts p1 through p4) of the active material body 2. The reason is that when an upper layer (for example, the second part p2) is formed on a lower layer (for example, the first part p1) by vapor deposition, the vapor-depositing material is deposited also on the projections 3 on the first part p1 to bury the projections 3 partially or entirely.

In the active material body 2 shown in FIG. 8, the projections 3 are formed on an upper side surface part of each of the parts p1 through p5. Depending on the formation conditions of the active material body 2 or the like, the projections 3 formed on the first through fourth parts p4 are occasionally buried by the vapor-depositing material and cannot be seen, and the projections 3 are only seen on the surface of the uppermost layer, i.e., the fifth part p5.

In this embodiment, the structure of the active material body 2 is not limited to the five-layer structure (stacking number n:5) shown in FIG. 8. The stacking number n of the active material body 2 may be, for example, 2 or greater or 50 or smaller. As the stacking number n is large (for example, is 30 or greater), the cross-section of each active material body 2 may not appear zigzag but may appear like a generally straight column along the normal to the current collector 1. Even in such a case, it can be confirmed that the active material body grows zigzag upward from the bottom surface to the top surface of the active material body by, for example, observing an SEM photograph of the cross-section thereof.

With the negative electrode 200 in this embodiment, when each active material body 2 occludes lithium and expands, the plurality of projections 3 formed on a side surface of the active material body 2 act as a stopper for suppressing the lateral expansion of the active material body 2. Therefore, a space for retaining the electrolytic solution can be secured between adjacent active material bodies 2. Especially where the projections 3 are formed on both side surfaces of the cross-section of the active material body 2 as shown in FIG. 8, a sufficient space can be advantageously secured between the active material bodies 2.

With the conventional negative electrode, in order to improve the electrolytic solution retaining capability, the width of each active material body needs to be decreased to form a larger space between the active material bodies. In this embodiment, it is not necessary to decrease the width of the active material bodies. This provides an advantage that the electrolytic solution retaining capability can be improved while the capacitance of the cell is kept high.

In addition, in Embodiment 1, the active material bodies 2 grow in the same inclining direction with respect to the normal to the current collector 1. For this reason, the expansion stress applied on the surface of the current collector 1 at the time of charge increases in a particular direction, which may wrinkle the current collector 1 or cause the active material bodies 2 to be detached from the current collector 1. The space 4 between the active material bodies is also inclined in substantially the same manner. Therefore, especially when the active material bodies 2 are high, the lithium ions in the electrolytic solution existing in the space 4 occasionally become unlikely to migrate. By contrast, in this embodiment, the active material bodies 2 grow zigzag upward from the bottom surface to the top surface, and as a result, each active material body 2, as a whole, grows along the normal to the current collector 1. Therefore, a large expansion stress can be prevented from being generated in a particular direction on the surface of the current collector 1. Since the lithium ions in the electrolytic solution existing in the space 4 are also likely to migrate, the rate characteristic can be further improved.

Example 2-1

A negative electrode in Example 1-1 was produced by forming active material bodies having a two-layer structure (stacking number n:2) on the current collector. The method and results will be described.

The negative electrode in Example 2-1 was formed by the following method using the vapor deposition device 500 described above with reference to FIG. 4. The copper foil used as the current collector 1, the purity of the silicon 26 as the vapor-depositing material, and the purity of the oxygen gas were substantially the same as those in Example 1-1.

First, like in Example 1-1, the copper foil 1 was set on the stage 22 of the vapor deposition device 500, and the silicon 26 was accommodated in the crucible 25. In order to control the vapor deposition direction, the stage 22 was located such that a surface thereof would be inclined by a prescribed angle (here, 60 degrees) with respect to a plane 33 parallel to a top surface (vapor-depositing surface) of the silicon 26. The position of the mask 24 was adjusted such that the incidence angle ω of silicon with respect to the current collector 1 would be 60 degrees. Then, the interior of the chamber 21 was exhausted. The degree of vacuum at this stage (initial degree of vacuum) was set to 0.003 Pa, unlike in Example 1-1.

Next, the silicon 26 was heated using an electron beam (not shown) while oxygen gas was introduced into the chamber 21 via the nozzle 27 to perform vapor deposition (hereinafter, referred to as the "first stage vapor deposition step"). The flow rate of the oxygen gas was controlled to be 200 SCCM, by which the degree of vacuum (degree of vacuum at the time of film formation) in the chamber 21 became 0.03 Pa. Regarding the electron beam for irradiating the crucible 25 accommodating the silicon 26, the acceleration voltage was set to −13 kV and the emission voltage was set to 1100 mA. The film formation time of the first stage vapor deposition step was set to 10 minutes.

During the first stage vapor deposition step, the surface of the current collector 1 was provided with silicon atoms and the oxygen gas, and an oxide of silicon was selectively grown on the bumps on the surface of the current collector 1 by the shadowing effect described above. Thus, the first part was formed.

Then, the inclining direction of the stage 22 was switched to change the incidence direction of the vapor-depositing material (vapor deposition direction). Here, the stage 22 was inclined by 60 degrees with respect to the plane 33 parallel to the vapor-depositing surface of the silicon 26, in the opposite direction to the inclining direction in the first stage vapor deposition step, so that the incidence angle ω of the silicon was adjusted to −60 degrees. In this state, vapor deposition was performed in substantially the same conditions as those in the first stage vapor deposition step (hereinafter, referred to as the "second stage vapor deposition step"). The film formation time of the second stage vapor deposition step was set to 8 minutes.

As a result of the second stage vapor deposition step, the second part inclined in the opposite direction to that of the first part with respect to the normal to the current collector 1 was formed on the first part p1, which was obtained in the first stage vapor deposition step. In this manner, the active material bodies each including the first and second parts were formed on the surface of the current collector 1, and the negative electrode was obtained.

FIG. 9(a) is an SEM photograph of a cross-section of the negative electrode in Example 2-1 produced by the above-described method. FIG. 9(b) is a cross-sectional view schematically showing one active material body in Example 2-1.

Figure 9:
FIG. 9(a) is an SEM photograph of a cross-section of a negative electrode in Example 2-1.
FIG. 9(b) is a cross-sectional view schematically showing one active material body of the negative electrode in Example 2-1.
Figure 9:
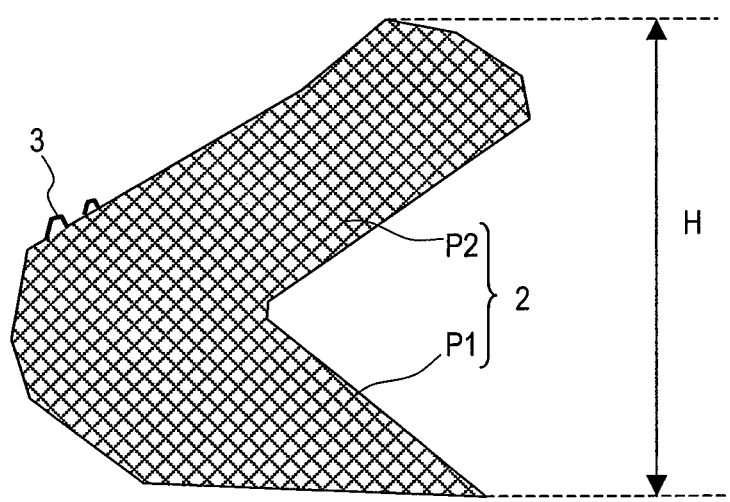

As seen from FIG. 9, each active material body 2 includes the first part p1 and the second part p2 formed on the first part p1. The first part p1 and the second part p2 are inclined in the opposite directions to each other with respect to the normal to the current collector 1. On the upper side surface part of each of the first part p1 and the second part p2, the projections 3 are formed. The schematic view of FIG. 9(b) shows only the relatively large projections 3 formed on a bottom part of the upper side surface part of the second part p2.

In this example, the average height H of the active material bodies 2 is 32 μm. The growth rate of the active material bodies 2, which was calculated from this value, was 30 nm/sec.

From these results, it was confirmed that even where a plurality of stages of oblique vapor deposition are performed while the vapor deposition direction is switched, the active material bodies 2 having the projections 3 on a side surface thereof can be formed by controlling the growth rate of the active material bodies and the flow rate of the oxygen gas.

In this example, the active material bodies 2 having a two-layer structure were formed. By performing a plurality of stages of vapor deposition repeatedly while switching the inclining direction of the stage 22, active material bodies having any stacking number n can be formed.

Embodiment 3

Hereinafter, a negative electrode in Embodiment 3 according to the present invention will be described with reference to the figures. Unlike in Embodiment 1, in this embodiment, a regular pattern of bumps/dents is formed on the surface of the current collector to control the locations of the active material bodies.

Figure 10:
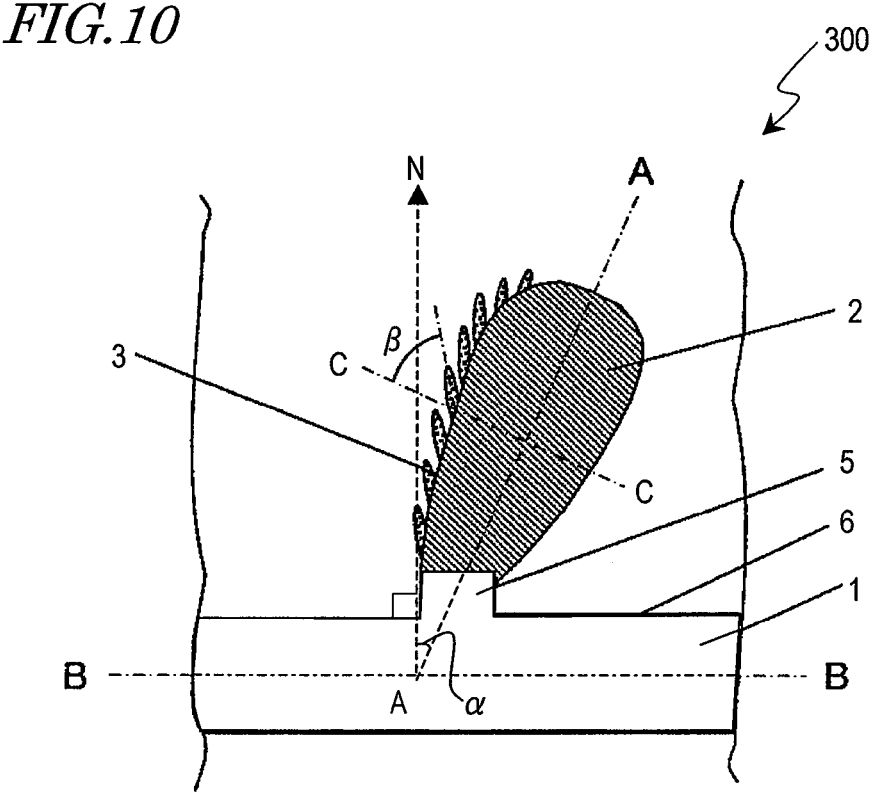
FIG. 10 is a schematic cross-sectional view showing an example of one active material body of a negative electrode in Embodiment 3 according to the present invention.
Figure 11:
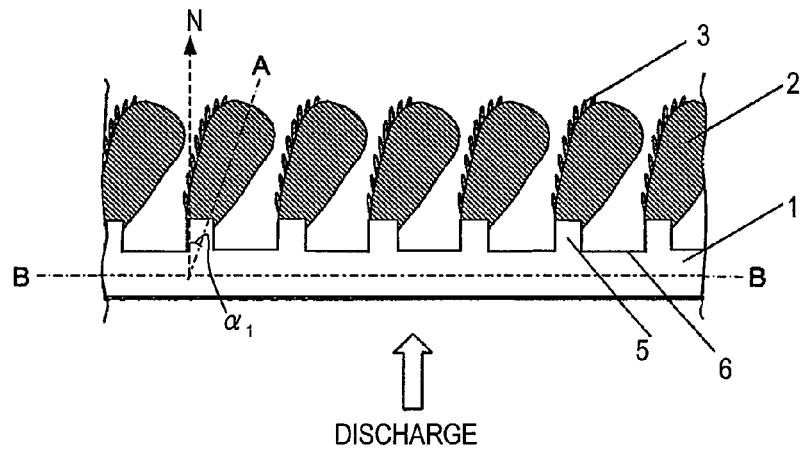
FIGS. 11(a) and (b) are schematic partial cross-sectional views respectively showing a pre-charge state and a post-charge state of the negative electrode in Embodiment 3.
Figure 11:
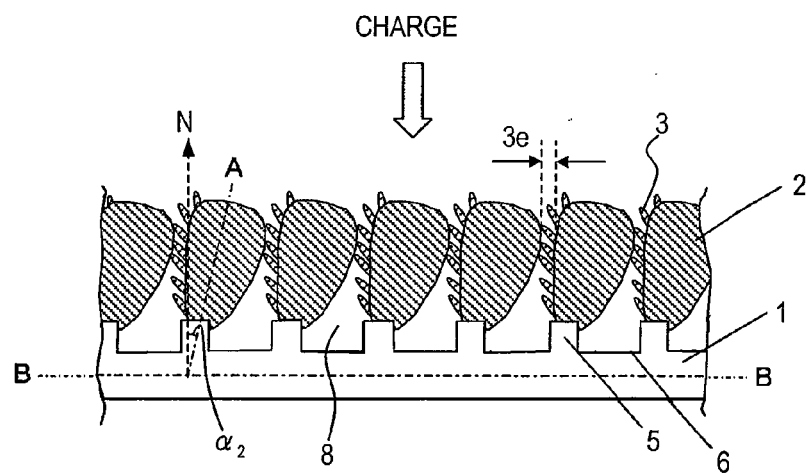

FIG. 10 is a schematic cross-sectional view showing an example of one active material body in the negative electrode in this embodiment. FIGS. 11(a) and (b) are schematic partial cross-sectional views respectively showing a pre-charge state and a post-charge state of the negative electrode in this embodiment.

The negative electrode 300 includes a current collector 1 having a bumps/dents pattern including dents 6 and bumps 5 on a surface thereof, and an active material body 2 formed on each of the bumps 5 of the current collector 1. The current collector 1 is formed of a conductive metal material, for example, a copper foil. The active material body 2 contains an active material represented by, for example, $SiO_x$ ($0<x\leq2.0$) and has a shape of a column inclined with respect to the normal N of the current collector 1. The angle α made by a central line (A-A) of the active material body 2 and the normal N (hereinafter, such an angle will be referred to as "inclining angle") may be 0 degrees or greater and 90 degrees or smaller, and is, for example, 10 degrees or greater and 80 degrees or smaller. The active material body 2 having such a structure can be formed by oblique vapor deposition using a sputtering method or a vacuum vapor deposition method.

The active material body 2 has a plurality of projections (projecting bodies) 3 on an upper side surface part, namely, a side surface part 92 on the side on which the central line (A-A) of the active material body 2 and a central line (B-B) of the current collector 1 in the thickness direction make an obtuse angle. In the example shown in the figures, the projections 3 extend along the normal N to the current collector 1, but the direction in which the projections 3 extend is not specifically limited in this embodiment. Note that the projections 3 preferably extend upward with respect to a line (C-C) vertical to the central line (A-A) of the active material body 2 in the cross-section shown in the figures (i.e., preferably extend in the direction away from the current collector 1). Namely, angle β made by the direction in which the projections 3 extend and the vertical line (C-C) is preferably 0 degrees or greater and 90 degrees or smaller.

In a nonaqueous electrolytic secondary cell (hereinafter, referred to simply as the "cell") produced using the negative electrode 300, each active material body 2 is inclined with respect to the surface of the current collector 1 before the cell is charged as shown in FIG. 11(a). After the cell is charged, as shown in FIG. 11(b), each active material body 2 occludes lithium ions and expands, and as a result, stands more upright than before the cell is charged. Namely, post-charge inclining angle α2 of the active material body 2 is smaller than pre-charge inclining angle α1. At this stage, because of the expansion of the active material body 2, the projections 3 formed on the side surface of the active material body 2 contact the side surface of an adjacent active material body 2 and act as a stopper for suppressing further lateral expansion of the active material body 2. As a result, a space 3e for retaining the electrolytic solution can be left between the active material bodies 2. Such a function of the projections 3 will be described later in detail.

When the cell is discharged, as shown in FIG. 11(a), the active material body 2 releases the occluded lithium ions and again contracts, and obtains the inclining angle α1, which is larger than the inclining angle α2 in the charged state.

The volume and the inclining angle α1 of the active material body 2 in the discharged state are smaller than the volume and the inclining angle α of the active material body which has never occluded lithium ions (hereinafter, referred to as the "active material body immediately after formation"). A conceivable reason for this is that a part of the lithium ions occluded by the active material body 2 are not released and stays therein even after the cell is discharged. In this manner, the inclining angle of the active material body 2 varies among immediately after formation, after the cell is charged, and after the cell is discharged in accordance with the amount of the lithium ions occluded in the active material body 2. In this specification, these inclining angles are distinguished by labeling the inclining angle immediately after formation as α, the inclining angle after the cell is charged as α2, and the inclining angle after the cell is discharged as α1.

Now, the function of the projections 3 formed on the active material body 2 when the cell is charged and discharged will be described in detail.

Figure 12:
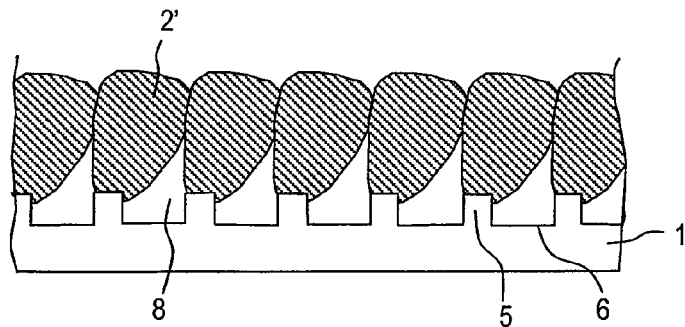
FIG. 12 is a schematic partial cross-sectional view showing a post-charge state of a conventional negative electrode.

First, the problems of a conventional negative electrode including active material bodies with no projection will be described. FIG. 12 is a cross-sectional view schematically showing a post-charge state of the conventional negative electrode. As shown in the figure, when an active material body 2' occludes lithium ions and expands, the active material body 2' is unlikely to expand in the vicinity of the bottom surface thereof because the active material body 2' is bound by the bump 5 of the current collector 1 in this area. However, the active material body 2' largely expands in the vicinity of the top surface thereof and occasionally contacts an adjacent active material body 2' almost completely. As a result, a space 8 is formed above each dent 6, and the electrolytic solution is confined in this space 8. Therefore, at the time of discharge, the lithium ions in the electrolytic solution existing in the space 8 are prevented from migrating by the closely contacting active material bodies 2', which reduces the rate characteristic.

By contrast, in this embodiment, as shown in FIG. 11(b), even in a fully charged state, the active material bodies 2 can be prevented from contacting each other completely owing to the plurality of projections 3 formed on the active material bodies 2. Therefore, at the time of discharge, the lithium ions in the electrolytic solution existing in the space 8, which is between the active material bodies 2 and above each dent 6, can easily migrate toward the positive electrode via the space 3e secured by the projections 3. Thus, the electrolytic solution is likely to flow via the space 3e and the migration of the lithium ions is not prevented. This can significantly improve the discharge characteristic at the high rate discharge or at low temperature as compared to the conventional art.

As described above, according to this embodiment, a non-aqueous electrolytic secondary cell which is superb in the charge/discharge cycle characteristic and the low temperature characteristic while being capable of realizing a high capacitance can be obtained.

The negative electrode 300 in this embodiment includes the active material bodies 2 obliquely standing on the surface of the current collector 1. This provides the following advantages. Referring to FIG. 11(a) again, in an initial period of charge, the active material bodies 2 obliquely stand on the surface of the current collector 1 at the inclining angle α1. Therefore, when seen from the positive electrode (not shown) provided so as to face the negative electrode 300, each dent 6 of the current collector 1 on which the active material body 2 is not formed (hereinafter, such a dent 6 will be referred to as the "exposed part") is concealed by the active material bodies 2. Namely, the active material layer of the positive electrode faces the active material bodies 2 but hardly faces the exposed parts of the current collector 1. Hence, when the cell is charged, the lithium ions released from the positive electrode are prevented by the active material bodies 2 of the negative electrode 300 from directly reaching the exposed parts (the surface of the dents 6) of the current collector 1, and most of the lithium ions are occluded by the active material bodies 2. Therefore, the precipitation of the lithium metal is suppressed.

In this embodiment, the inclining angle α of the active material body 2 (the inclining angle α immediately after formation) can be freely designed based on the shape of, and the interval between, the bumps 5. In one example, where the interval between the bumps 5 is 15 the inclining angle α can be set in the range of 35 degrees or greater and 55 degrees or smaller. Owing to this, a part of the surface of the current collector 1 on which the active material bodies 2 are not formed (here, the part on which the bumps 6 are formed) is concealed by the active material bodies 2 so as not to be directly seen from the positive electrode. This can effectively prevent the lithium metal from being precipitated on the surface of the current collector 1.

As described above, the angle β of the projections 3 formed on the active material bodies 2 is preferably in the range of 0 degrees or greater and 90 degrees or smaller, and is more preferably set to the range of 30 degrees or greater and 90 degrees or smaller. Owing to this, when the inclining angle of each active material body 2 is made smaller at the time of charge, the projections 3 extend toward the side surface of an adjacent active material body 2. This allows the space 3e between the active material bodies 2 to be enlarged at the time of charge. Like in the above embodiments, where the plurality of projections 3 have various shapes or sizes, at least a part of these projections 3 needs to have the angle β in the above-described range.

In the example shown in the figures, the projections 3 formed in a top part of the side surface of the active material body 2 is larger than the projections 3 formed in a bottom part of the side surface thereof. The size of the projections 3 varies in accordance with the formation conditions of the active material bodies 2 and is not limited to the example shown in the figures.

Figure 13:
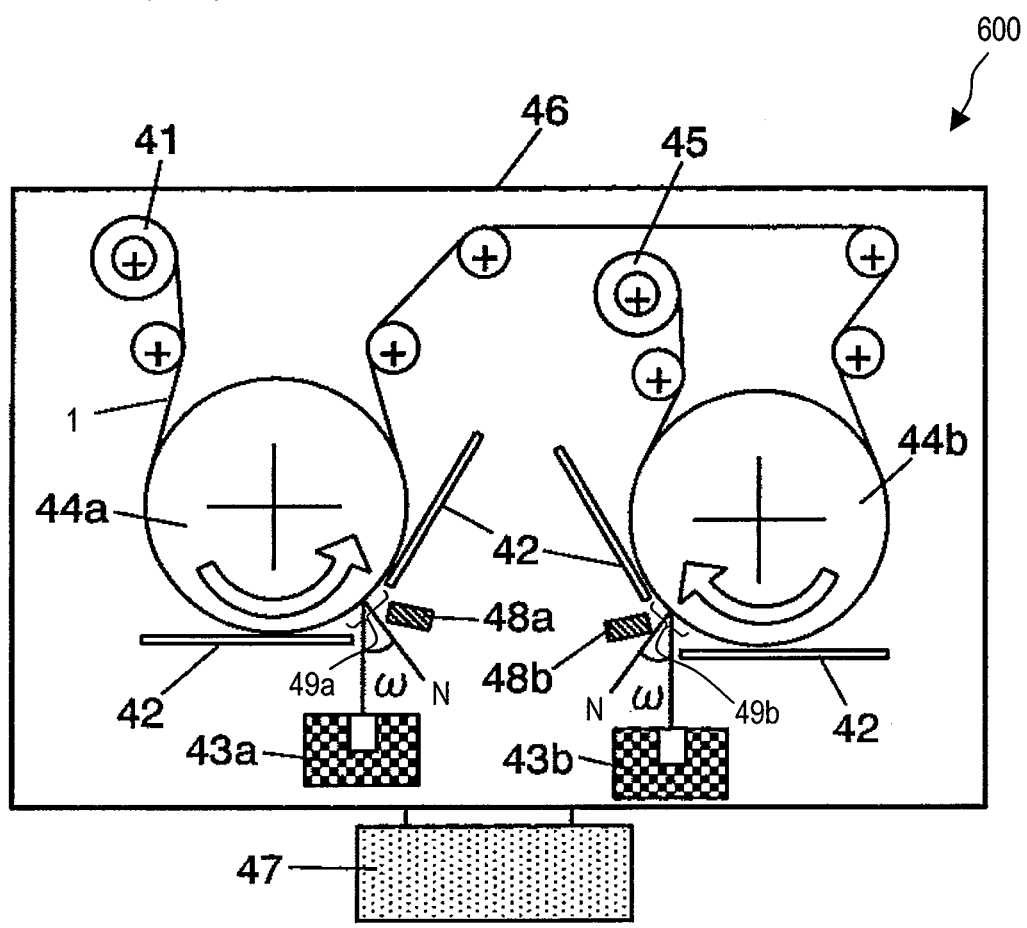
FIG. 13 is a schematic cross-sectional view showing another example of production device (vapor deposition device) used for forming the active material bodies.

Now, a method for producing a negative electrode in this embodiment will be described. FIG. 13 is a schematic cross-sectional view showing an example of a production device (vapor deposition device) usable for forming the active material bodies 2. FIG. 14(a) through (d) are cross-sectional views provided to explain production steps of the method for forming the active material bodies 2 in this embodiment. FIGS. 14(b) through (d) show only one bump in FIGS. 14(a) and (d) in enlargement for easier understanding.

First, a structure of the production device used in this embodiment will be described. The production device 600 includes a vacuum container 46 and a vacuum pump 47 for reducing the pressure in the vacuum container 46. The vacuum container 46 accommodates a take-up roll 41, film forming rolls 44a and 44b, and a supply roll 45. These rolls are structured such that a sheet-like current collector 1 fed out from the take-up roll 41 runs along the film forming roll 44a, is put inside out, then runs along the film forming roll 44b, and is collected by the supply roll 45. Below the film forming rolls 44a and 44b, vaporization sources 43a and 43b are respectively provided. Masks 42 are provided between the film forming roll 44a, 44b and the vaporization sources 43a, 43b, and regulate the angle ω at which the vapor-depositing material from the vaporization source 43a is incident on the current collector 1 (incidence angle ω) running on the film forming rolls 44a, 44b. The incidence angle ω is the angle made by the incidence direction of the vapor-depositing material and the normal N to the current collector 1. Accordingly, vapor deposition areas 49a and 49b are formed, in which the substrate 1 running on the film forming rolls 44a and 44b is treated with vapor deposition in a prescribed direction (oblique vapor deposition). Oxygen nozzles 48a and 48b are located for supplying oxygen gas to the current collector 1 passing the vapor deposition areas 49a and 49b. The oxygen nozzles 48a and 48b are preferably located such that oxygen gas is supplied in a direction inclined oppositely, with respect to the normal N to the current collector 1, to the direction in the vapor-depositing material is incident.

The negative electrode in this embodiment can be formed by, for example, the following method using the production device 600.

First, as shown in FIG. 14(a), the current collector 1 having a bumps/dents pattern at least on one surface thereof is formed. Here, the current collector 1 is obtained by forming a plurality of bumps 5 by a plating method on both surfaces S1 and S2 of a strip-like electrolytic copper foil having a thickness of 30 μm. The bumps 5 are not formed on a part of each of the surfaces S1 and S2 of the current collector 1. Such a part will be referred to as a "dent 6". Here, for example, the bumps 5 having a shape of a quadrangular prism with a diamond-shaped top surface (height: e.g., 5 μm or greater and 10 μm or smaller) are located on the surface of the current collector 1. The interval between adjacent bumps 5 is set to 13 μm or greater and 17 μm or smaller (for example, 15 μm). Then, the obtained current collector 1 is set to the take-up roll 41 of the production device 600.

Next, the current collector 1 is fed from the take-up roll 41. At this stage, a vapor deposition unit (a unit of the vaporization sources, a crucible and an electron beam generator) is used to allow the vapor-depositing material to be vaporized from the vaporization sources 43a and 43b. As the vapor-depositing material, for example, Si (scrap silicon; purity: 99.999%) is used. The vaporized Si atoms are incident on the current collector 1, passing the vapor deposition areas 49a and 49*b*, in a direction inclined by the angle ω (for example, 30 degrees) with respect to the normal N to the current collector 1. At the same time, oxygen ($O_2$) gas is supplied from the oxygen nozzles 48*a* and 48*b* to the vapor deposition areas 49*a* and 49*b*. The internal pressure of the vacuum container 46 is set to, for example, an oxygen atmosphere of $1 \times 10^{-2}$ Pa.

Figure 14:
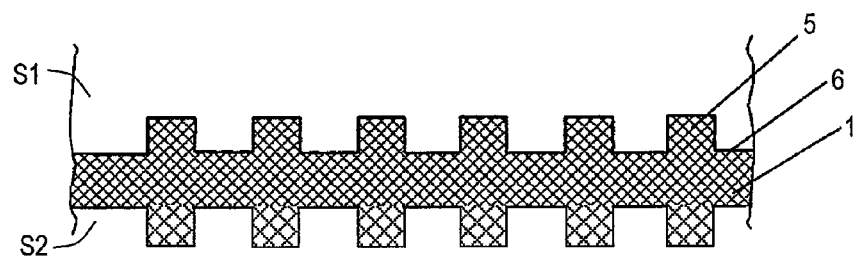
FIGS. 14(a) through (d) are cross-sectional views showing production steps showing a method for forming the active material bodies in Embodiment 3 according to the present invention.
Figure 14:
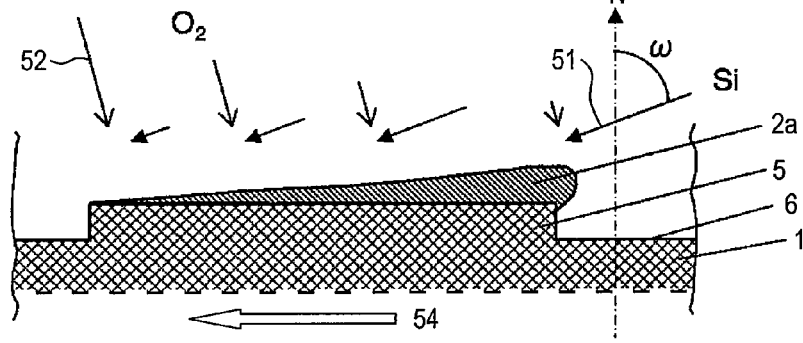
Figure 14:
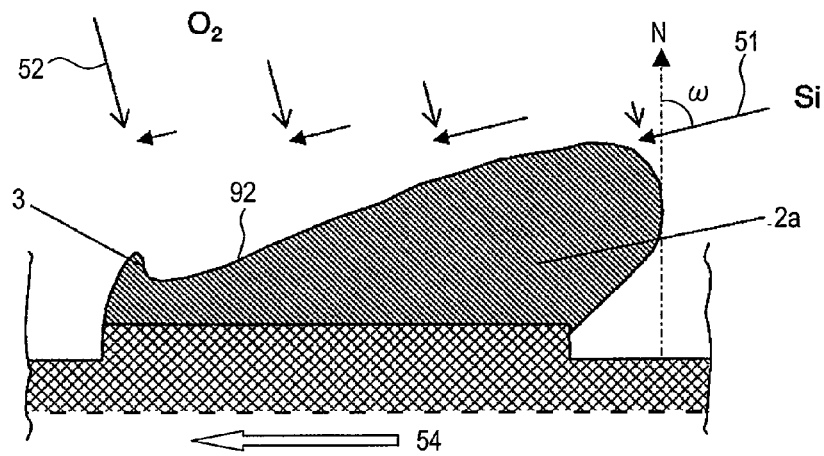
Figure 14:
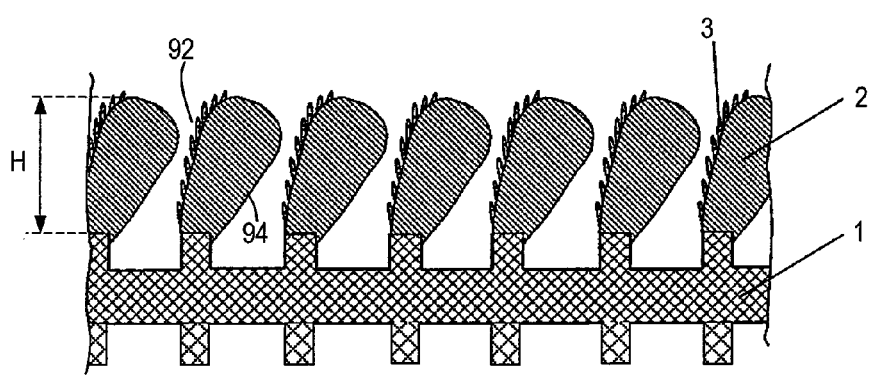

The current collector 1 fed from the take-up roll 41 is first introduced to the vapor deposition area 49*a* along the film forming roll 44*a*. As shown in FIG. 14(*b*) in enlargement, on the surface S1 of the current collector 1 running in the vapor deposition area 49*a* in a direction 54, Si as a vapor-depositing material is incident in a direction 51 inclined by the angle ω with respect to the normal N to the current collector 1. Oxygen gas is supplied in a direction 52 inclined oppositely to the incidence direction of Si with respect to the normal N to the current collector 1. As a result, an oxide of silicon ($SiO_x$) 2*a* in which Si and oxygen are bonded is selectively grown on the bumps 5 by the shadowing effect described above (reactive vapor deposition). The growth direction is determined by the incidence direction and the incidence angle of Si.

The amounts of Si and $O_2$ to be supplied to the current collector 1 running in the vapor deposition area 49*a* varies in accordance with the positional relationship among the vaporization source 43*a*, the oxygen nozzle 48*a* and the bump 5 as represented by the lengths of arrows 51 and 52 in FIG. 14(*b*). As a result, the value of the oxygen ratio x in the oxide of silicon 2*a* (molar ratio of the amount of oxygen with respect to the amount of silicon) sequentially varies in the moving direction 54 of the current collector 1. In the example shown in FIG. 14(*b*), the oxygen ratio x in the oxide of silicon 2*a* is low on the incidence side of silicon (right in the figure) and increases toward the incidence side of the oxygen gas (left in the figure).

As the vapor deposition proceeds and thus the oxide of silicon 2*a* grows, as shown in FIG. 14(*c*), the projections 3 are formed on a part 92 of the surface of the oxide of silicon 2*a* on the side on which the oxygen ratio x is higher (left in the figure). As described later in detail, the projections 3 are considered to be generated as a result of the following: while Si as a vapor-depositing material is flying to be deposited on the current collector 1, Si is bound with oxygen gas, or collides against oxygen gas and is scattered. For this reason, the projections 3 are not always formed, but the conditions in which projections 3 are formed heavily rely especially on the film formation rate of the oxide of silicon 2*a*, the degree of vacuum in the vacuum container 46 during the film formation, and the like. For example, where the film formation rate is 10 nm/sec. or lower, the scattered component is not sufficient and so the projections 3 are unlikely to be formed. The formation conditions of the projections 3 are not uniquely determined but vary in relation with the other factors including, for example, the degree of vacuum.

As a result of the vapor deposition being performed in the vapor deposition area 49*a*, as shown in FIG. 14(*d*), the active material body 2 having the plurality of projections 3 on the upper side surface part 92 is formed on each bump 5 on the surface S1 of the current collector 1. In this embodiment, each active material body 2 has a shape of a column having a generally circular cross-section. The shape, height (height from the top surface of the bump 5) H and width of the active material body 2, the interval between adjacent active material bodes and the like may be appropriately adjusted in accordance with the bumps/dents pattern formed on the surface of the current collector 1, the formation conditions of the active material bodies 2 or the like.

Then, the current collector 1 is put inside out, and is introduced to the vapor deposition area 49*b* along the film forming roll 44*b*. Although not shown, in the vapor deposition area 49*b*, Si is incident from the vaporization source 43*b*, and oxygen gas is supplied from the oxygen nozzle 48*b*, on the other surface S2 of the current collector 1. As a result, as described above with reference to FIGS. 14(*b*) and (*c*), the active material body 2 having the projections 3 is formed on each bump 5 of the surface S2.

After the active material bodies 2 are formed on the surfaces S1 and S2, the current collector 1 is collected by the supply roll 45. In this manner, a negative electrode having the active material bodies 2 on both of the surfaces S1 and S2 of the current collector 1 is produced.

Now, FIG. 14(*d*) will be referred to again. In each active material body 2 formed by the above-described method, the value of the oxygen ratio x is higher on the upper side surface part (side surface part farther from the surface of the current collector 1) 92 and decreases toward a lower side surface part (side surface part closer to the surface of the current collector 1) 94. The projections 3 are formed on the upper side surface part 92, and the oxygen ratio thereof is higher than the maximum value of the oxygen ratio x of the active material bodies 2.

The mechanism by which the projections 3 are formed on a side surface of the active material body 2 depending on the film formation conditions including the film formation rate and the degree of vacuum is not precisely clarified, but is estimated as follows.

As a method for forming the active material bodies 2 at intervals in accordance with the bumps 5 on the current collector 1, it is known to allow the vaporizing particles from the vaporization sources 43*a* and 43*b* to be obliquely incident on the current collector 1 (oblique vapor deposition). In this case, the growth direction of the active material bodies 2 is macroscopically determined by the angle ω made by the normal N to the current collector 1 and the incidence direction 51 of the vaporizing particles. In the case of oblique vapor deposition, during the initial period of the growth of the active material bodies 2, the shadowing effect is caused to the vaporizing particles by adjacent bumps 5 on the current collector 1 and also by the oxide of silicon 2*a* itself when the oxide of silicon 2*a* has grown to some extent. As a result, the vaporizing particles do not fly to a part of the surface of the current collector which is shadowed by the growing oxide of silicon 2*a*. Therefore, the oxide of silicon does not grow on this part. Thus, the active material bodies 2 are formed at intervals. This is a phenomenon which is well known to occur when the degree of vacuum is sufficiently high and the linearity of advancement of the vaporizing particles is high.

By contrast, where the oxygen gas or the like is introduced into the vacuum container to decrease the degree of vacuum, the vaporizing particles flying from the vaporization sources 43*a* and 43*b* have a short average free travel distance. As a result, components of the vaporizing particles which are bonded with oxygen gas, or collide against oxygen gas and are scattered (components of the vaporizing particles which are deflected at an angle different from the incidence angle ω) are generated. However, the following occurs on a surface of the oxide of silicon 2*a*. A majority of the vaporizing particles fly to grow as the oxide of silicon 2*a* on a part of the surface. Even if the scattered components of the vaporizing particles grow on such a part in an inclining direction different from the growth direction of the oxide of silicon 2*a*, such scattered components are incorporated into the oxide of silicon 2*a* because of the growth of the majority of the vaporizing particles. Therefore, the active material bodies 2 are formed as being continuously grown.

By contrast, the upper side surface part 92 of the growing oxide of silicon 2a described above is shadowed by the oxide of silicon 2a, and therefore is not exposed to the majority of the vaporizing particles flying in the direction 51. However, among the scattered components of the vaporizing particles, at least the components scattered toward the active material body 2 fly toward the upper side surface part of the active material body 2 at a prescribed angle and grow. The number of such scattered components of the vaporizing particles is sufficiently smaller than the number of the vaporizing particles forming the active material body 2. Therefore, such vaporizing particles are not grown to be a continuous film but are grown discretely. As a result, the projections 3 are formed.

The projections 3 are formed at a prescribed angle with respect to the surface of the active material body 2 on which the projections 3 are formed, depending on the angle ω at which the scattered components of the vaporizing particles fly. Since the projections 3 are formed of the scattered components of the vaporizing particles, the size and the shape of the projections 3 may be appropriately controlled in accordance with the degree of vacuum, the film formation rate, the type or flow rate of the gas to be introduced, the shape of the bumps 5 of the current collector 1, or the like.

In this embodiment, the materials of the current collector 1 and the active material bodies 2 are not limited to those described above. For example, the current collector 1 may be formed of, instead of the copper foil 1, a metal foil of stainless steel, nickel, copper, titanium or the like; or a thin film of carbon or a conductive resin. The current collector 1 may be surface-treated with carbon, nickel, titanium or the like. The method for forming the bumps/dents pattern on the surface of the current collector 1 is not limited to plating. For example, a metal foil is etched using a resist resin or the like to form a groove of a prescribed pattern in the metal foil. Alternatively, a metal or ceramic mold having a bumps/dents pattern may be pressed on the surface of the metal foil for pressurization, so as to transfer the shape of the mold or the like onto the metal foil.

An active material to be contained in the active material body 2 is preferably, for example, silicon (Si) or tin (Sn), which reversibly occludes and releases lithium ion and has a theoretical capacitance density exceeding 833 mAh/cm$^3$. Any of such active materials can provide the effect of the present invention in either form of a single element, an alloy, a compound, a solid solution or a composite active material containing a silicon material or a tin material. Examples of the silicon-containing materials include Si, $SiO_x$ ($0<x \leq 2.0$), and an alloy, a compound and a solid solution thereof in which a part of Si is substituted with at least one element selected from the group consisting of Al, In, Cd, Bi, Sb, B, Mg, Ni, Ti, Mo, Co, Ca, Cr, Cu, Fe, Mn, Nb, Ta, V, W, Zn, C, N, and Sn. Examples of the tin-containing materials include $Ni_2Sn_4$, $Mg_2Sn$, $SnO_x$ ($0<x \leq 2$), $SnO_2$, $SnSiO_3$ and LiSnO.

In this embodiment, the active material body 2 may contain any of the above-described active materials independently or in combination. A combination of a plurality of the above-described active materials may be, for example, a compound containing Si, oxygen and nitrogen, or a composite of a plurality of compounds in which the ratio of Si and oxygen are different.

Figure 15:
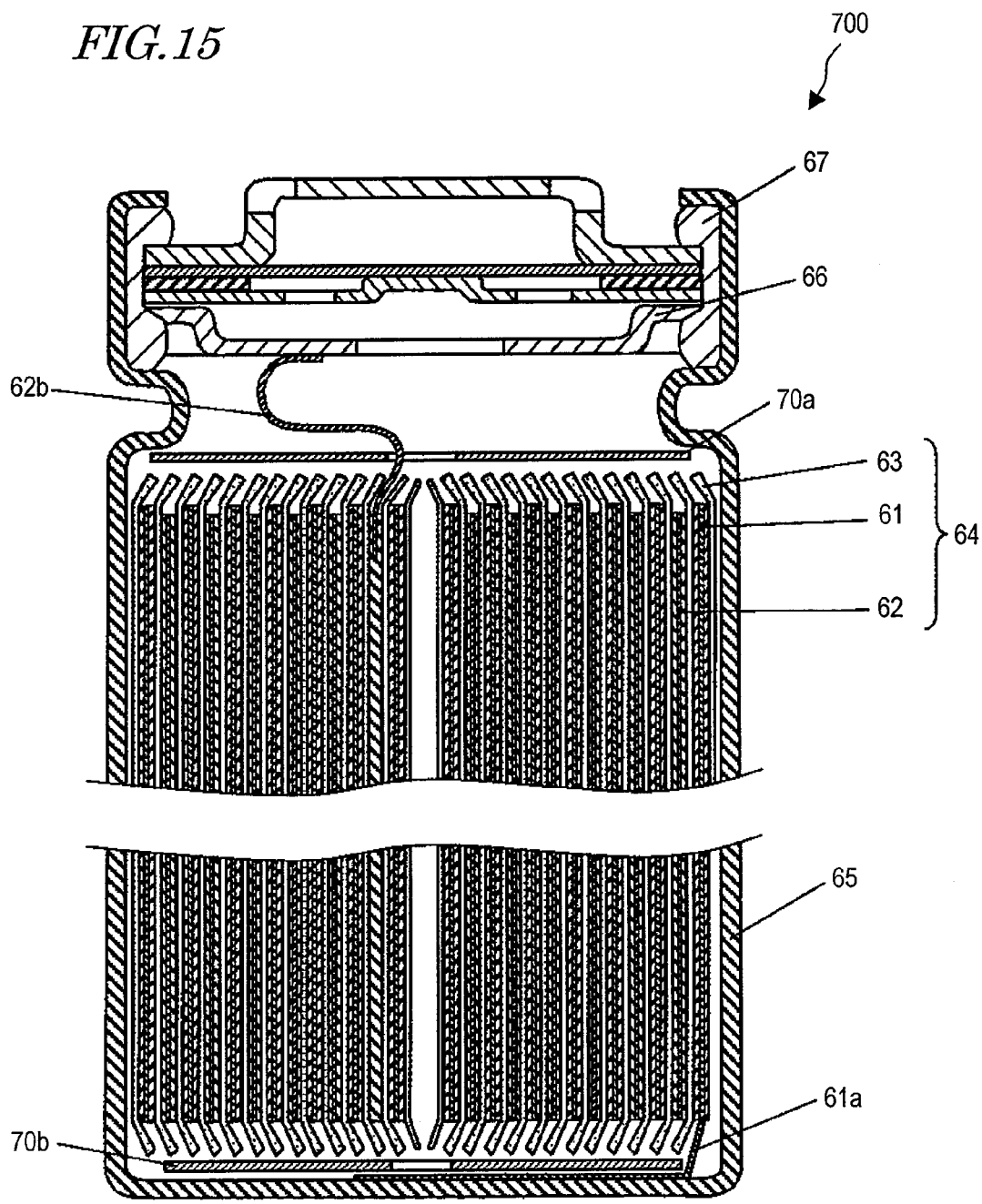
FIG. 15 is a cross-sectional view showing an example of a cell produced using a negative electrode according to the present invention.

In this embodiment, the negative electrode is applied to, for example, a cylindrical nonaqueous electrolytic secondary cell (hereinafter, referred to as a "cell") described below. FIG. 15 is a cross-sectional view showing an example of a cell produced using the negative electrode in this embodiment.

The cell 700 shown in FIG. 15 includes a negative electrode 61, a positive electrode 62 located so as to face the negative electrode 61 for reducing the lithium ions at the time of discharge, and a nonaqueous electrolysis (not shown) having a lithium ion conductivity. Here, the negative electrode 61 is connected to one end of a negative electrode lead 61a formed of, for example, copper. The positive electrode 62 is connected to one end of a positive electrode lead 62a formed of, for example, aluminum. As the negative electrode 61, the negative electrode produced by the method described above with reference to FIG. 13 and FIG. 14 is usable. As the positive electrode 62, a known positive electrode having a positive electrode current collector and a positive electrode mixture layer, which is formed on the positive electrode current collector and contains a positive electrode active material may be used.

Such a cell is produced as follows. First, the negative electrode 61 and the positive electrode 62 are wound while holding therebetween a separator 63 for preventing direct contact of the negative electrode 61 and the positive electrode 62 to form an electrode assembly 64. Insulating plates 70a and 70b are located above and below the electrode assembly 64. The other end of the positive electrode lead 62a is welded to a sealing plate 66, and the other end of the negative electrode lead 61a is welded to a bottom part of a cell case 65, and the assembly thereof is inserted into the cell case 65. Next, a nonaqueous electrolysis (not shown) for conducting lithium ions is injected into the cell case 65, and an open end of the cell case 65 is caulked with the sealing plate 66 via an insulating gasket 67.

The positive electrode mixture layer used in the above-described cell contains, as a positive electrode active material, a lithium-containing composite oxide such as $LiCoO_2$, $LiNiO_2$, $Li_2MnO_4$, or a mixture or a composite compound thereof. Other materials usable as the positive electrode active material include olivine type lithium phosphate represented by the general formula of $LiMPO_4$ (M=V, Fe, Ni, Mn) and lithium fluorophosphate represented by the general formula of $Li_2MPO_4F$ (M=V, Fe, Ni, Mn). A part of such a lithium-containing compound may be substituted with a different type of element. Such a lithium-containing compound may be surface-treated with a metal oxide, a lithium oxide, a conductor or the like; or the surface thereof may be treated to be hydrophobic.

The positive electrode mixture layer further includes a conductor and a binder. Usable materials as the conductor include, for example, graphites such as natural graphite, artificial graphite and the like; carbon black materials such as acetylene black, Ketjen black, channel black, furnace black, lamp black, thermal black and the like; conductive fibers such as carbon fiber, metal fiber and the like; metal powders such as carbon fluoride, aluminum and the like; conductive whiskers such as zinc oxide, potassium titanate and the like; conductive metal oxides such as titanium oxide and the like; and organic conductive materials such as phenylene derivatives and the like. Usable materials as the binder include, for example, PVDF, polytetrafluoroethylene, polyethylene, polypropylene, aramid resin, polyamide, polyimide, polyamideimide, polyacrylonitrile, polyacrylic acid, polyacrylic acid methylester, polyacrylic acid ethylester, polyacrylic acid hexylester, polymethacrylic acid, polymethacrylic acid methylester, polymethacrylic acid ethylester, polymethacrylic acid hexylester, poly(vinyl acetate), polyvinylpyrrolidone, polyether, polyethersulfone, hexafluoro polypropylene, styrene butadiene rubber, and carboxymethyl cellulose. Alternatively, a copolymer of two or more materials selected from tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene may be used. A mixture of two or more materials selected from these may be used.

Usable materials for the positive electrode current collector used for the positive electrode 62 include, for example, aluminum (Al), carbon, and conductive resins. Any of these materials may be surface-treated with carbon or the like.

Materials usable for the nonaqueous electrolysis of the cell include an electrolytic solution obtained by dissolving a solute in an organic solvent, and a so-called polymer electrolytic layer which contains such an electrolytic solution and is made non-fluidal by a polymer. At least where an electrolytic solution is used, it is preferable to use a separator 3 formed of nonwoven cloth, microporous film or the like of polyethylene, polypropylene, aramid resin, amideimide, polyphenylene sulfide, polyimide or the like between the positive electrode 61 and the negative electrode 62 and to impregnate the separator 63 with the electrolytic solution.

The separator 63 may contain a heat-resistant filler such as alumina, magnesia, silica, titania or the like inside or on a surface thereof. Separately from the separator 63, a heat-resistant layer formed of such a filler and substantially the same binder as used for the positive electrode 62 and the negative electrode 61 may be provided.

The material for the nonaqueous electrolysis is selected based on the oxidation/reduction potential of the active materials. Examples of the solute preferably usable for the nonaqueous electrolysis include $LiPF_6$; $LiBF_4$; $LiClO_4$; $LiAlCl_4$; $LiSbF_6$; LiSCN; $LiCF_3SO_3$; $LiCF_3CO_2$; $LiAsF_6$; $LiB_{10}Cl_{10}$; lower aliphatic lithium carboxylate; LiF; LiCl; LiBr; LiI; chloroborane lithium; borates such as bis(1,2-benzenediolate (2-)-O,O') lithium borate, bis(2,3-naphthalenediolate(2-)-O, O') lithium borate, bis(2,2'-biphenyldiolate(2-)-O,O') lithium borate, bis(5-fluoro-2-olate-1-benzenesulfonic acid-O,O') lithium borate, and the like; $LiN(CF_3SO_2)_2$; $LiN(CF_3SO_2)(C_4F_9SO_2)$; $LiN(C_2F_5SO_2)_2$; lithium tetraphenylborate; and other salts generally used for lithium cells.

Materials usable as the organic solvent for dissolving these salts include any of, or a mixture of two or more of, ethylene carbonate (EC), propylene carbonate, butylene carbonate, vinylene carbonate, dimethyl carbonate (DMC), diethyl carbonate, ethylmethyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxymethane, tetrahydrofran derivatives including tetrahydrofran and 2-methyltetrahydrofran, dimethyl sulfoxide, dioxorane derivatives including 1,3-dioxorane and 4-methyl-1,3-dioxorane, formamide, acetoamide, dimethylformamide, acetonitrile, propylnitrile, nitromethane, ethyl monoglyme, phosphoric acid triester, acetic acid ester, propionic acid ester, sulforane, 3-methyl sulforane, 1,3-dimethyl-2-imidazolidinone, 3-methyl-2-oxazolidinone, propylene carbonate derivatives, ethylether, diethylether, 1,3-propanesultone, anisole, fluorobenzene, and other solvents generally used for lithium cells.

The organic solvent may further contain any of the following additives: vinylene carbonate, cyclohexylbenzene, biphenyl, diphenylether, vinylethylene carbonate, divinylethylene carbonate, phenylethylene carbonate, diallyl carbonate, fluoroethylene carbonate, catecol carbonate, vinyl acetate, ethylene sulfite, propanesultone, trifluoropropylene carbonate, dibenzofuran, 2,4-difluoroanisole, o-terphenyl, m-terphenyl, and the like.

Any of the above-described solutes may be mixed with one of, or a mixture of two or more of, the following polymers to be used as a solid electrolysis: polyethylene oxide, polypropylene oxide, polyphosphazene, polyaziridine, polyethylene sulfide, poly(vinyl alcohol), poly(vinylidene fluoride), polyhexafluoropropylene and the like. Any of the above-described solutes may also be mixed with any of the above-described organic solvents to be used as a gel. An inorganic material such as lithium nitride, lithium halide, lithium oxysalt, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, phosphorus sulfide compound and the like may be used as a solid electrolysis. A gel-like nonaqueous electrolysis, when used, may be located between the negative electrode 61 and the positive electrode 61 instead of the separator 63. The gel-like nonaqueous electrolysis may be located adjacent to the separator 3.

Here, a structure of a cylindrical cell is described, but the electrode according to the present invention is also applicable to a stacking type cell described above with reference to FIG. 6.

Now, the negative electrode according to the present invention will be described more specifically by way of examples. The present invention is not limited to the following examples and may be carried out with different materials or the like as long as the gist of the present invention is not changed.

Examples and Comparative Examples

Negative electrodes in Examples 3-1 through 3-3 and Comparative examples 3-1 and 3-2 were produced, and the cross-sections of the active material bodies of these negative electrodes were observed and the oxygen ratios thereof were measured. Cylindrical cells (test cells) were produced using the negative electrodes in the examples and the comparative examples and evaluated. The methods and results will be described.

(1) Method for Producing a Negative Electrode and a Test Cell

Example 3-1

In Example 3-1, a negative electrode was produced using the production device 600 described above with reference to FIG. 13, and a cylindrical cell was produced using the obtained negative electrode. The method for producing the negative electrode and the cylindrical cell in Example 3-1 will be described.

(i) Production of a Negative Electrode

First, a plurality of bumps were formed at an interval of 15 μm by the plating method on both surfaces of a strip-like electrolytic copper foil having a thickness of 30 μm to obtain a current collector. In this example, as the bumps, quadrangular prisms (height: e.g., 10 μm) having a diamond-shaped top surface (diagonal line length: 20 μm×15 μm) were formed. Then, the obtained current collector 1 was set to the take-up roll 41 of the production device 600.

Next, the active material bodies were formed using the production device 600 in substantially the same method as that described above with reference to FIG. 14. The flow rate of oxygen gas supplied from the nozzle 27 was set to 30 SCCM, and the internal pressure of the vacuum container 46 was set to an oxygen atmosphere of $8 \times 10^{-3}$ Pa. For vapor deposition, an electronic beam generated from the electronic beam generator was deflected by a deflection yoke and directed to the vaporization sources 43a and 43b. For the vaporization sources 43a and 43b, a leftover material generated when a semiconductor wafer is produced (scrap silicon; purity: 99.999%) was used. The shape of the opening of the mask 42 was adjusted such that the incidence angle ω of silicon would be 30 degrees. The film formation rate was controlled to be about 20 nm/sec. In this manner, the active material bodies were formed on both surfaces of the current collector.

Next, the cross-section of the active material body was observed using a scanning electron microscope (SEM, S-4700 produced by Hitachi, Ltd.) to confirm that a plurality of projections were formed on an upper side surface of the active material body. The inclining angle α of the active material body was found to be about 50 degrees. The thickness of the active material body (height from the top surface of the bump on the current collector) H was 20 μm, and the average height of the projections formed on the active material body was 3 μm and the average diameter thereof was 0.5 μm. Here, the "average height of the projections" is an average value of the heights h of the projections described above with reference to FIG. 3, and the "average diameter of the projections" is an average value of the widths w of the projections described above.

The amount of Si in the active material body was measured by ICP emission spectrometry, and the amount of oxygen in the active material body was measured by a combustion method. As a result of calculating the ratio of Si and oxygen from these values, it was found that the average composition of the active material body was $SiO_{0.4}$ (the average value $x_{AVE}$ of the molar ratio x of the oxygen amount with respect to the silicon amount (oxygen ratios)=0.4).

Using an x-ray microanalyzer (EPMA), an oxygen distribution of the active material body was examined by measuring a linear distribution in the width direction of a cross-section of the active material body which is vertical to the current collector and includes the vapor deposition direction. The oxygen ratio (value of x) was continuously increased from the lower side surface of the active material body toward the upper side surface thereof (i.e., from the surface on the side on which the inclining angle α is an acute angle toward the surface on the side on which the inclining angle α is an obtuse angle).

Then, Li metal was vapor-deposited on the surface of the active material bodies obtained by the above-described method to a thickness of 8 μm by the vacuum vapor deposition method to obtain a negative electrode in Example 3-1.

On the inner side of the negative electrode in Example 3-1, a 30 mm exposed part was provided on the Cu foil which was not to face the positive electrode, and a negative electrode lead formed of Cu was welded thereto.

(ii) Production of a Positive Electrode

In this example, a positive electrode having a positive electrode active material capable of occluding and releasing lithium ions was produced by the following method.

First, 93 parts by weight of $LiCoO_2$ powder as the positive electrode active material and 4 parts by weight of acetylene black as the conductor were mixed. The obtained powder was mixed with an N-methyl-2-pyrrolidone (NMP) solution of poly(vinylidene fluoride) (PVDF) as the binder (#132 produced by Kureha Corporation) such that the weight of PVDF would be 3 parts by weight. To the obtained mixture, an appropriate amount of NMP was added to prepare a positive electrode mixture layer paste. The obtained positive electrode mixture layer paste was applied to both surfaces of a positive electrode current collector (thickness: 15 μm) formed of an Al foil by a doctor blade method. The obtained assembly was rolled such that the positive electrode mixture layer would have a density of 3.5 g/cc and a thickness of 160 μm, and sufficiently dried at 80° C., and cut to obtain a positive electrode. On the inner side of the positive electrode, an exposed part was provided on the Al foil which was not to face the negative electrode, and a positive electrode lead formed of Al was welded thereto.

(iii) Production of a Test Cell

A cylindrical cell as shown in FIG. 15 was produced using the negative electrode and the positive electrode obtained as the above-described method. The negative electrode and the positive electrode were wound while holding therebetween a separator having a thickness of 20 μm and formed of porous polypropylene to obtain an electrode assembly. The obtained electrode assembly and a mixed ethylene carbonate/diethyl carbonate solution of $LiPF_6$ as the electrolytic solution were accommodated in the cell case, and the opening of the cell case was sealed with the sealing plate and the gasket. In this manner, a cylindrical cell having a diameter of 10 mm and a total height of 65 mm was produced. This cell is labeled as test cell No. 1. The designed capacity of the test cell No. 1 was 2800 mAh.

Example 3-2

In Example 3-2, the current collector was formed in substantially the same manner as in Example 3-1, and the active material bodies were formed on both surfaces of the current collector in substantially the same manner as in Example 3-1. For the formation of the active material bodies, the flow rate of oxygen gas was set to 60 SCCM, and the internal pressure of the vacuum container was set to an oxygen atmosphere of $1 \times 10^{-2}$ Pa. The incidence angle ω of silicon was adjusted to 30 degrees, and the film formation rate was adjusted to about 20 nm/sec.

The cross-section of the active material body obtained by the above-described method was observed using an SEM to confirm that a plurality of projections were formed on an upper side surface of the active material body. The average height of the projections was 3 μm, and the average diameter thereof was 0.5 μm. The inclining angle α of the active material body was about 52 degrees. The thickness (height) H of the active material body was 20 μm.

As a result of obtaining the oxygen ratio with respect to Si of the active material body in this example by substantially the same method as in Example 3-1, it was found that the average composition was $SiO_{0.65}$ (the average value $x_{AVE}$ of the molar ratio of the oxygen amount with respect to the silicon amount=0.65).

Then, Li metal was vapor-deposited on the surface of the active material bodies to a thickness of 12 μm by the vacuum vapor deposition method to obtain a negative electrode in Example 3-2.

Next, a cylindrical cell was produced by substantially the same method as in Example 3-1 except that the negative electrode of Example 3-2 was used. This cylindrical cell is labeled as test cell No. 2.

Example 3-3

In Example 3-3, the current collector was formed in substantially the same manner as in Example 3-1, and the active material bodies were formed on both surfaces of the current collector in substantially the same manner as in Example 3-1. For the formation of the active material bodies, the flow rate of oxygen gas was set to 80 SCCM, and the internal pressure of the vacuum container was set to an oxygen atmosphere of $1.3 \times 10^{-2}$ Pa. The incidence angle ω of silicon was adjusted to 30 degrees, and the film formation rate was adjusted to about 20 nm/sec.

The cross-section of the active material body obtained by the above-described method was observed using an SEM to confirm that a plurality of projections were formed on an upper side surface of the active material body. The average height of the projections was 3 and the average diameter thereof was 0.5 μm. The inclining angle α of the active material body was about 54 degrees. The thickness (height) H of the active material body was 20 μm.

As a result of obtaining the oxygen ratio with respect to Si of the active material body in this example by substantially the same method as in Example 3-1, it was found that the average composition was $SiO_{0.85}$ (the average value $x_{AVE}$ of the molar ratio of the oxygen amount with respect to the silicon amount=0.85).

Then, Li metal was vapor-deposited on the surface of the active material bodies to a thickness of 15 μm by the vacuum vapor deposition method to obtain a negative electrode in Example 3-3.

Next, a cylindrical cell was produced by substantially the same method as in Example 3-1 except that the negative electrode of Example 3-3 was used. This cylindrical cell is labeled as test cell No. 3.

Comparative Example 3-1

In Comparative example 3-1, the current collector was formed in substantially the same manner as in Example 3-1, and the active material bodies were formed on both surfaces of the current collector in substantially the same manner as in Example 3-1. For the formation of the active material bodies, oxygen gas was not introduced to the vacuum container, and the internal pressure of the vacuum container was set to $2\times10^{-3}$ Pa. The incidence angle ω of silicon was adjusted to 30 degrees, and the film formation rate was adjusted to about 20 nm/sec.

The cross-section of the active material body obtained by the above-described method was observed using an SEM to find that no projections were formed on a side surface of the active material body. The inclining angle α of the active material body was about 47 degrees. The thickness (height) H of the active material body was 13 μm.

As a result of obtaining the oxygen ratio with respect to Si of the active material body in this example by substantially the same method as in Example 3-1, it was found that the average composition was $SiO_{0.15}$ (the average value $x_{AVE}$ of the molar ratio of the oxygen amount with respect to the silicon amount=0.15).

Then, Li metal was vapor-deposited on the surface of the active material bodies to a thickness of 4 μm by the vacuum vapor deposition method to obtain a negative electrode in Comparative example 3-1.

Next, a cylindrical cell was produced by substantially the same method as in Example 3-1 except that the negative electrode of Comparative example 3-1 was used. This cylindrical cell is labeled as test cell No. 4.

Comparative Example 3-2

In Comparative example 3-2, the current collector was formed in substantially the same manner as in Example 3-1, and the active material bodies were formed on both surfaces of the current collector in substantially the same manner as in Example 3-1. For the formation of the active material bodies, the flow rate of oxygen gas was set to SCCM, and the internal pressure of the vacuum container was set to an oxygen atmosphere of $8.0\times10^{-3}$ Pa. The incidence angle ω of silicon was adjusted to 30 degrees, and the film formation rate was adjusted to about 2 nm/sec.

The cross-section of the active material body obtained by the above-described method was observed using an SEM to find that no projections were formed on a side surface of the active material body. The inclining angle α of the active material body was about 50 degrees. The thickness (height) H of the active material body was 20 μm.

As a result of obtaining the oxygen ratio with respect to Si of the active material body in this example by substantially the same method as in Example 3-1, it was found that the average composition was $SiO_{0.4}$ (the average value $x_{AVE}$ of the molar ratio of the oxygen amount with respect to the silicon amount=0.4).

Then, Li metal was vapor-deposited on the surface of the active material bodies to a thickness of 8 μm by the vacuum vapor deposition method to obtain a negative electrode in Comparative example 3-2.

Next, a cylindrical cell was produced by substantially the same method as in Example 3-1 except that the negative electrode of Comparative example 3-2 was used. This cylindrical cell is labeled as test cell No. 5.

(2) Evaluation Methods of the Test Cells

The test cells No. 1 through No. 5 obtained as described above were evaluated by the following methods in terms of the cell capacitance, capacitance maintaining ratio and low temperature characteristic.

<Measurement of the Cell Capacitance>

Each test cell was charged and discharged in repetition under the following conditions at an environmental temperature of 25° C.

First, according to the designed capacitance (2800 mAh), the cell was charged by a constant current of an hour rate of 0.5 C (1400 mA) until the cell voltage became 4.2 V, and then was subjected to constant voltage charge of attenuating the current to an hour rate of 0.05 C (140 mA) at the constant voltage of 4.2 V. Then, the operation was recessed for 30 minutes. Then, the cell was discharged at a constant current of an hour rate of 1.0 C (2800 mA) until the cell voltage was reduced to 2.5 V.

The above-described charge and discharge was set as one cycle, and the discharge capacitance at the third cycle was labeled as the "cell capacitance" of the respective test cell.

<Capacitance Maintaining Ratio>

Each test cell was charged and discharged in repetition under the following conditions at an environmental temperature of 25° C.

First, according to the designed capacitance (2800 mAh), the cell was charged by a constant current of an hour rate of 0.5 C (1400 mA) until the cell voltage became 4.2 V, and then was charged at the constant voltage of 4.2 V until the charge current was reduced to an hour rate of 0.05 C (140 mA). After the charge, the operation was recessed for 30 minutes. Then, the cell was discharged at a constant current of an hour rate of 1.0 C (2800 mA) until the cell voltage was reduced to 2.5 V. After the discharge, the operation was recessed for 30 minutes.

The above-described charge and discharge was set as one cycle, and 100 cycles were performed. The ratio of the discharge capacitance at the 100th cycle with respect to the discharge capacitance at the first cycle, which is represented as percentage, was labeled as the "capacitance maintaining ratio (%)". As the capacitance maintaining ratio is closer to 100, the charge/discharge cycle characteristic is higher.

<Low Temperature Characteristic>

Each test cell was charged and discharged in repetition under the following conditions at an environmental temperature of 25° C.

First, according to the designed capacitance (2800 mAh), the cell was charged by a constant current of an hour rate of 0.5 C (1400 mA) until the cell voltage became 4.2 V, and then was subjected to constant voltage charge of attenuating the current to an hour rate of 0.05 C (140 mA) at the constant voltage of 4.2 V. Then, the operation was recessed for 30 minutes. Then, the cell was discharged at a constant current of an hour rate of 1.0 C (2800 mA) until the cell voltage was reduced to 3.0 V. The discharge capacitance at this point was labeled as the "discharge capacitance at 25° C.".

Then, the cell was charged under the same conditions as above, and discharged at an environmental temperature of −10° C. at a constant current of an hour rate of 1.0 C (2800 mA) until the cell voltage was reduced to 2.5 V. The discharge capacitance at this point was labeled as the "discharge capacitance at −10° C.".

The ratio of the discharge capacitance at −10° C. with respect to the discharge capacitance at 25° C. was obtained as percentage (%) and was labeled as the "low temperature characteristic (%)".

(3) Measurement Results of the Negative Electrodes and the Cell Samples

The production conditions and measurement results of the negative electrodes of the test cells No. 1 through No. 5 are shown in Table 1. The evaluation results of these cell samples are shown in Table 2.

TABLE 1

| Test cell | | Degree of vacuum (Pa) | Flow rate of oxygen gas (SCCM) | Film formation rate (nm/s) | Inclining angle α (°) | Height of active material body H (μm) | Average value of oxygen ratio of $SiO_x$ ($x_{AVE}$) | Presence/absence of projections |
|---|---|---|---|---|---|---|---|---|
| Example | No. 1 | $8.0 \times 10^{-3}$ | 30 | 20 | 50 | 20 | 0.4 | Present |
| | No. 2 | $1.0 \times 10^{-2}$ | 60 | 20 | 52 | 20 | 0.65 | Present |
| | No. 3 | $1.3 \times 10^{-2}$ | 80 | 20 | 54 | 20 | 0.85 | Present |
| Comparative example | No. 4 | $2.0 \times 10^{-3}$ | 0 | 20 | 47 | 13 | 0.15 | Absent |
| | No. 5 | $8.0 \times 10^{-3}$ | 5 | 2 | 50 | 20 | 0.4 | Absent |

TABLE 2

| Test cell | Cell capacitance (mAh) | Capacitance maintaining ratio (%) | Low temperature characteristic (%) |
|---|---|---|---|
| No. 1 | 2870 | 92 | 80 |
| No. 2 | 2800 | 91 | 81 |
| No. 3 | 2715 | 92 | 83 |
| No. 4 | 2985 | 85 | 58 |
| No. 5 | 2935 | 85 | 70 |

As shown in Table 1, in the test cells No. 1 through No. 3, as the introduction amount of oxygen (flow rate of oxygen gas) for forming the active material bodies is larger, namely, as the degree of vacuum is lower, the average value $x_{AVE}$ of the oxygen ratio of the active material bodies is larger. This occurs because since a great amount of oxygen is present in the vacuum container, the amount of oxygen which is bonded with the Si particles vaporized from the vaporization source increases. As shown in Table 2, as the average value $x_{AVE}$ of the oxygen ratio is larger, the capacitance of the test cell is smaller. This corresponds to the fact that as the $SiO_2$ and the oxygen ratio from Si increases, the occluded and released amount of Li ions decreases.

From the results shown in Table 1, it is understood that in the test cell No. 4, oxygen gas is not introduced for forming the active material bodies, and so no projections are formed on the active material bodies. In addition, although the mechanism is not clearly known, it is understood that in the test cell No. 5, the introduced amount of oxygen is small for forming the active material bodies and the film formation rate is a prescribed level or lower, and so no projections are formed on the active material bodies. The conditions in which the projections are formed are not uniquely determined but vary in relation with the other factors including, for example, the degree of vacuum.

It is understood that the test cells No. 1 through No. 3 have a good capacitance maintaining ratio and a good low temperature characteristic almost regardless of the inclining angle (obliquely standing angle) α of the active material bodies of the negative electrode. This is considered to occur because the projections formed on the active material bodies can alleviate the expansion stress and also prevents the convection current of the electrolytic solution from being inhibited.

Comparing the characteristics of the test cell No. 4 of Comparative example 3-1 and the characteristics of the test cell No. 1 of Example 3-1, the test cell No. 4 has a larger cell capacitance because the oxygen ratio in the negative electrode is lower than that in the test cell No. 1. However, the test cell No. 4 is much lower than the test cell No. 1 in the capacitance maintaining ratio and the low temperature characteristic. This is considered to occur for the following reason. In the test cell No. 4, no projections are formed on the active material bodies, and the oxygen ratio is low and the occluded amount of Li is large. Therefore, the expansion amount of the active material bodies is large. As a result, as the charge/discharge cycle proceeds, the adjacent active material bodies cannot be sufficiently suppressed from pushing each other, and so the capacitance maintaining ratio is significantly lowered. In addition, it is considered that since the convection current of the electrolytic solution is likely to be inhibited by the expansion of the active material bodies, the low temperature characteristic is lowered.

Comparing the characteristics of the test cell No. 5 of Comparative example 3-2 and the characteristics of the test cell No. 1 of Example 3-1, the test cell No. 5 has a larger initial cell capacitance than that of the test cell No. 1, but is much lower than the test cell No. 1 in the capacitance maintaining ratio and the low temperature characteristic. This is considered to occur for the following reason. In the test cell No. 1, since the projections formed on the active material bodies hardly contribute to the occlusion and release of Li ions, the cell capacitance is smaller than that of the test cell No. 5. However, in the test cell No. 5, since no projections are formed on the active material bodies, as the charge/discharge cycle proceeds, adjacent active material bodies cannot be sufficiently suppressed from pushing each other, and so the capacitance maintaining ratio is significantly lowered. In addition, since the convection current of the electrolytic solution is likely to be inhibited by the expansion of the active material bodies, the low temperature characteristic is lowered.

In the negative electrode in the above examples, the Li metal was vapor-deposited to a prescribed thickness in accordance with each example, but this was performed in order to compensate for the irreversible capacitance of the cell and does not specifically influence the effect of the present invention.

The active material used for the negative electrode is not limited to Si or $SiO_x$ used in the above examples, but may be any material which contains an element capable of reversibly occluding and releasing lithium ions. It is preferable that the active material contains at least one element selected from Al, In, Zn, Cd, Bi, Sb, Ge, Pb, Sn and the like. The active material may contain a material other than the above-listed elements, for example, a transition metal or a IIA-group element.

The surface shape of the current collector 1 is not limited to the bumps/dents pattern described in the above examples, and may be any shape which can utilize the shadowing effect for forming the active material bodies 2.

The inclining angle α, shape, size and the like of the active material bodies 2 are not limited to those of the above examples, and may be appropriately changed in accordance with the production method of the negative electrode or the characteristics required for a nonaqueous electrolytic secondary cell in which the negative electrode is to be used.

In the above embodiments, the active material body and the projections are integrally formed and contain substantially the same material (oxide of silicon). According to the present invention, it is not necessary that the active material body and the projections are integrally formed. The projections may be formed of a material different from that of the active material body, and the materials of the projections does not need to contain a material capable of occluding and releasing lithium.

INDUSTRIAL APPLICABILITY

A negative electrode for a nonaqueous electrolytic secondary cell according to the present invention is applicable to various forms of nonaqueous electrolytic secondary cells and is especially useful for a cell which requires a wide electrode plate, such as a wound type cell. The negative electrode for a nonaqueous electrolytic secondary cell according to the present invention is preferably applicable to secondary cells which are usable in a wide range of applications from mobile devices such as mobile phones, notebook computers, PDAs and the like which are expected to have a large demand in the future to large scale electronic devices.

The invention claimed is:

1. A negative electrode for a nonaqueous electrolytic secondary cell, comprising:
a current collector; and
a plurality of active material bodies formed on a surface of the current collector at intervals, wherein:
each of the active material bodies contains a material for occluding or releasing lithium, and
a plurality of projections are formed on a part of a side surface of each of the active material bodies.

2. The negative electrode for a nonaqueous electrolytic secondary cell of claim 1, wherein at least a part of the projections of each active material body is located in a part of the side surface thereof, the part facing an active material body adjacent to the each active material body.

3. The negative electrode for a nonaqueous electrolytic secondary cell of claim 1, wherein the plurality of projections have a width of 0.5 μm or greater and 5 μm or smaller and a height of 0.5 μm or greater and 5 μm or smaller.

4. The negative electrode for a nonaqueous electrolytic secondary cell of claim 1, wherein each active material body grows in a direction inclining with respect to the surface of the current collector.

5. The negative electrode for a nonaqueous electrolytic secondary cell of claim 4, wherein each active material body is inclined with respect to the surface of the current collector at the time of discharge, and the plurality of projections are formed on an upper part of the side surface of each active material body.

6. The negative electrode for a nonaqueous electrolytic secondary cell of claim 4, wherein each active material body includes a plurality of parts growing in different growth directions.

7. The negative electrode for a nonaqueous electrolytic secondary cell of claim 1, wherein:
the material for occluding or releasing lithium contained in each active material body is an oxide of silicon ($SiO_x$), and
an average value $x_{AVE}$ of a molar ratio of an oxygen amount with respect to a silicon amount in the oxide of silicon is greater than 0 and smaller than 2.

8. The negative electrode for a nonaqueous electrolytic secondary cell of claim 7, wherein:
the plurality of projections contain the oxide of silicon ($SiO_x$), and
a molar ratio y of the oxygen amount with respect to the silicon amount in the plurality of projections is larger than the average value $x_{AVE}$ of the molar ratio of the oxygen amount with respect to the silicon amount in each active material body.

9. The negative electrode for a nonaqueous electrolytic secondary cell of claim 7, wherein:
the plurality of projections contain an oxide of silicon ($SiO_y$), and
the molar ratio y of the oxygen amount with respect to the silicon amount in the plurality of projections is 1.5 or greater and 2 or smaller.

10. The negative electrode for a nonaqueous electrolytic secondary cell of claim 7, wherein the average value $x_{AVE}$ of the molar ratio of the oxygen amount with respect to the silicon amount in each active material body is 0.1 or greater and 0.6 or smaller.

11. The negative electrode for a nonaqueous electrolytic secondary cell of claim 1, wherein a plurality of bumps are formed on the surface of the current collector, and each active material body is formed on a corresponding bump.

12. A nonaqueous electrolytic secondary cell, comprising:
a positive electrode capable of occluding and releasing lithium ions;
the negative electrode for a nonaqueous electrolytic secondary cell of claim 1;
a separator located between the positive electrode and the negative electrode for a nonaqueous electrolytic secondary cell; and
an electrolysis having a lithium ion conductivity.

13. The negative electrode for a nonaqueous electrolytic secondary cell of claim 1, wherein the each of the plurality of active material bodies is column-shaped and extends from the surface of the current collector.

14. The negative electrode for a nonaqueous electrolytic secondary cell of claim 1, wherein the plurality of projections are not in contact with the surface of the current collector.

15. The negative electrode for a nonaqueous electrolytic secondary cell of claim 1, wherein each of the plurality of projections is column-shaped and extends from the side surface of the each of the active material bodies.

16. The negative electrode for a nonaqueous electrolytic secondary cell of claim 1, wherein each of the plurality of projections extends from the side surface of the each of the active material bodies in a direction away from the surface of the current collector.

17. The negative electrode for a nonaqueous electrolytic secondary cell of claim 1, wherein the plurality of active material bodies are not in contact with each other.

18. The negative electrode for a nonaqueous electrolytic secondary cell of claim 3, a height of the active material bodies along a normal line to the current collector is 15 to 32 μm.

* * * * *